United States Patent
Wang et al.

(10) Patent No.: US 11,392,197 B2
(45) Date of Patent: Jul. 19, 2022

(54) IMAGE RENDERING METHOD, DEVICE, SYSTEM, STORAGE MEDIUM, IMAGE DISPLAY METHOD AND COMPUTER DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Xuefeng Wang, Beijing (CN); Yukun Sun, Beijing (CN); Jinghua Miao, Beijing (CN); Lili Chen, Beijing (CN); Hao Zhang, Beijing (CN); Bin Zhao, Beijing (CN); Lixin Wang, Beijing (CN); Xi Li, Beijing (CN); Jianwen Suo, Beijing (CN); Wenyu Li, Beijing (CN); Jinbao Peng, Beijing (CN); Qingwen Fan, Beijing (CN); Yuanjie Lu, Beijing (CN); Chenru Wang, Beijing (CN); Yali Liu, Beijing (CN); Jiankang Sun, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 259 days.

(21) Appl. No.: 16/607,224

(22) PCT Filed: Apr. 1, 2019

(86) PCT No.: PCT/CN2019/080728
§ 371 (c)(1),
(2) Date: Oct. 22, 2019

(87) PCT Pub. No.: WO2019/218783
PCT Pub. Date: Nov. 21, 2019

(65) Prior Publication Data
US 2021/0333870 A1 Oct. 28, 2021

(30) Foreign Application Priority Data
May 16, 2018 (CN) .......................... 201810466112.4

(51) Int. Cl.
*G06F 3/01* (2006.01)
*G06T 3/40* (2006.01)
*G06T 5/00* (2006.01)

(52) U.S. Cl.
CPC ............ *G06F 3/013* (2013.01); *G06T 3/4038* (2013.01); *G06T 3/4092* (2013.01); *G06T 5/006* (2013.01)

(58) Field of Classification Search
CPC ....... G06F 3/013; G06T 5/006; G06T 3/4038; G06T 3/4092; G06T 3/0012;
(Continued)

(56) References Cited

U.S. PATENT DOCUMENTS

2012/0146891 A1\* 6/2012 Kalinli .................. H04N 19/115
345/156
2017/0169602 A1\* 6/2017 Blackmon ............. G06T 15/005
(Continued)

FOREIGN PATENT DOCUMENTS

CN 107065197 A 8/2017
CN 107317987 A 11/2017
(Continued)

*Primary Examiner* — Jeffery A Brier
(74) *Attorney, Agent, or Firm* — Dilworth & Barrese, LLP.; Michael J. Musella, Esq.

(57) ABSTRACT

An image rendering method, device, and system, a storage medium, and an image display method are provided. The image rendering method includes: acquiring an image to be displayed; according to a gaze point of human eyes on a display screen, obtaining a gaze point position on the image
(Continued)

to be displayed; determining, according to the gaze point position, a first sampling area and a second sampling area of the image to be displayed; performing first resolution sampling on the first sampling area to obtain a first display area; performing second resolution sampling on the image to be displayed to obtain a second display area corresponding to the second sampling area, a resolution of the second sampling area being greater than that of the second display area; and splicing the first display area and the second display area to obtain an output image to be transmitted to the virtual reality device.

16 Claims, 9 Drawing Sheets

(58) Field of Classification Search
CPC ............... G06T 3/0018; G06T 3/0025; G09G 2340/0407; G09G 2340/0414; G09G 2340/0421
See application file for complete search history.

(56) References Cited

U.S. PATENT DOCUMENTS

2017/0316607 A1* 11/2017 Khalid ............... G02B 27/0172
2018/0090052 A1* 3/2018 Marsh .................... G09G 3/001

FOREIGN PATENT DOCUMENTS

| CN | 107516335 A | 12/2017 |
|---|---|---|
| CN | 108076384 A | 5/2018 |
| CN | 108665521 A | 10/2018 |

* cited by examiner

IMAGE RENDERING METHOD, DEVICE, SYSTEM, STORAGE MEDIUM, IMAGE DISPLAY METHOD AND COMPUTER DEVICE

The present application claims priority of Chinese Patent Application No. 201810466112.4, filed on May 16, 2018, the disclosure of which is incorporated herein by reference in its entirety as part of the present application.

TECHNICAL FIELD

Embodiments of the present disclosure relate to an image rendering method for virtual reality, an image rendering device, an image rendering system, a computer readable storage medium, a computer device, and an image display method.

BACKGROUND

At present, the requirements for display definition, especially for the display definition of virtual reality (VR)/augmented reality (AR), are getting higher and higher, and an information amount of images, which are output by computer devices to display devices, is also getting larger and larger. For a high definition resolution rendering scene, there are great requirements for software computing speed, consumption of computing resources, and a transmission data amount of image data. For human eyes, because a concentration of cone cells on a retina responsible for observing colors and a concentration of cone cells on the retina responsible for observing details are different, details only in a center of a gaze point of the human eyes can be accepted, and any area, which is beyond a gaze area of human eyes by 5°, in the image will gradually reduce the definition.

With the development of display technology, a method, which performs compression processing based on algorithm on an image, cannot meet the demand due to poor real-time performance and large consumption of computing resources. How to improve the real-time performance and computational efficiency of image compression transmission becomes an urgent problem to be solved when saving the transmission bandwidth in the image transmission process.

SUMMARY

At least one embodiment of the present disclosure provides an image rendering method for virtual reality, comprising: acquiring an image to be displayed; according to a gaze point of human eyes on a display screen of a virtual reality device, obtaining a gaze point position, which corresponds to the gaze point, on the image to be displayed; determining, according to the gaze point position, a first sampling area and a second sampling area of the image to be displayed; performing first resolution sampling on the first sampling area to obtain a first display area; performing second resolution sampling on the image to be displayed to obtain a second display area corresponding to the second sampling area, in which a resolution of the second sampling area is greater than a resolution of the second display area; and splicing the first display area and the second display area to obtain an output image to be transmitted to the virtual reality device.

For example, in the image rendering method provided by some embodiments of the present disclosure, performing the first resolution sampling on the first sampling area and performing the second resolution sampling on the image to be displayed comprises: determining a rendering model according to the gaze point position, in which the rendering model comprises an original resolution sampling area, a compression resolution sampling area, and a resolution compression multiple of the compression resolution sampling area, the original resolution sampling area corresponds to the first sampling area, and the compression resolution sampling area corresponds to the second sampling area; and according to the rendering model, performing the first resolution sampling on the first sampling area and performing the second resolution sampling on the image to be displayed.

For example, in the image rendering method provided by some embodiments of the present disclosure, determining the rendering model according to the gaze point position comprises: acquiring an original rendering model, in which the original rendering model comprises an original original-resolution sampling area and an original compression resolution sampling area; and according to the gaze point position, adjusting a center point position of the original original-resolution sampling area and a resolution compression multiple of the original compression resolution sampling area to obtain the rendering model.

For example, in the image rendering method provided by some embodiments of the present disclosure, the resolution compression multiple of the original compression resolution sampling area is preset and adjusted according to a positional relationship between the original compression resolution sampling area and the original original-resolution sampling area.

For example, in the image rendering method provided by some embodiments of the present disclosure, the resolution compression multiple of the compression resolution sampling area comprises a transverse resolution compression multiple and/or a longitudinal resolution compression multiple.

For example, in the image rendering method provided by some embodiments of the present disclosure, the original resolution sampling area and the compression resolution sampling area form a nine-grid structure, the nine-grid structure comprises a plurality of areas arranged in three rows and three columns, and the original resolution sampling area is located in a second row and a second column of the nine-grid structure.

For example, in the image rendering method provided by some embodiments of the present disclosure, a size of the first sampling area, a size of the original original-resolution sampling area, and a size of the original resolution sampling area are identical.

For example, in the image rendering method provided by some embodiments of the present disclosure, adjusting the center point position of the original original-resolution sampling area comprises: in a case where a center point of the original original-resolution sampling area is the gaze point position, judging whether the original original-resolution sampling area exceeds a boundary of the image to be displayed: if not, adjusting the center point of the original original-resolution sampling area to be the gaze point position; and if yes, adjusting the center point of the original original-resolution sampling area to be a position closest to the gaze point position in a case where the original original-resolution sampling area does not exceed the boundary of the image to be displayed.

For example, in the image rendering method provided by some embodiments of the present disclosure, according to the rendering model, performing the second resolution sampling on the image to be displayed, comprises: according to the rendering model, performing the second resolution sampling on the image to be displayed to obtain an intermediate image to be displayed; and according to a positional relationship between the first sampling area and the second sampling area and a proportional relationship between the first sampling area and the second sampling area, dividing the intermediate image to be displayed to obtain a first intermediate display area corresponding to the first sampling area and a second intermediate display area corresponding to the second sampling area, in which the second display area comprises the second intermediate display area.

For example, in the image rendering method provided by some embodiments of the present disclosure, acquiring the image to be displayed comprises: acquiring an original image; and performing an inverse-distortion processing on the original image to obtain the image to be displayed.

For example, in the image rendering method provided by some embodiments of the present disclosure, a resolution of the first sampling area is equal to a resolution of the first display area.

At least some embodiments of the present disclosure also provide an image display method, comprising: in a rendering engine: acquiring an image to be displayed; according to a gaze point of human eyes on a display screen of a virtual reality device, obtaining a gaze point position, which corresponds to the gaze point, on the image to be displayed; determining, according to the gaze point position, a first sampling area and a second sampling area of the image to be displayed; performing first resolution sampling on the first sampling area to obtain a first display area; performing second resolution sampling on the image to be displayed to obtain a second display area corresponding to the second sampling area, in which a resolution of the second sampling area is greater than a resolution of the second display area; splicing the first display area and the second display area to obtain an output image; and transmitting the output image to the virtual reality device; and in the virtual reality device, stretching the output image by the virtual reality device to obtain a stretched image; and displaying the stretched image on the display screen of the virtual reality device.

For example, in the image display method provided by at least some embodiments of the present disclosure, the output image comprises the first display area and the second display area, and stretching the output image by the virtual reality device to obtain the stretched image comprises: stretching the second display area in the output image by the virtual reality device to obtain a stretched display area; and determining the stretched image according to the first display area and the stretched display area.

Some embodiments of the present disclosure also provide an image rendering device for virtual reality, comprising a gaze point projection module, a rendering engine, and a splicing module; the gaze point projection module is configure to obtain, according to a gaze point of human eyes on a display screen of a virtual reality device, a gaze point position, which corresponds to the gaze point, on the image to be displayed; the rendering engine is configure to: determine, according to the gaze point position, a first sampling area and a second sampling area of the image to be displayed; perform first resolution sampling on the first sampling area to obtain a first display area; and perform second resolution sampling on the image to be displayed to obtain a second display area corresponding to the second sampling area, in which a resolution of the second sampling area is greater than a resolution of the second display area; and the splicing module is configured to splice the first display area and the second display area to obtain an output image to be transmitted to the virtual reality device.

For example, in the image rendering device provided by at least some embodiments of the present disclosure, the rendering engine is further configured to: load a rendering model, that is, determine the rendering model, according to the gaze point position, in which the rendering model comprises an original resolution sampling area, a compression resolution sampling area, and a resolution compression multiple of the compression resolution sampling area, the original resolution sampling area corresponds to the first sampling area, and the compression resolution sampling area corresponds to the second sampling area; and according to the rendering model, perform the first resolution sampling on the first sampling area and perform the second resolution sampling on the image to be displayed.

For example, the image rendering device provided by at least some embodiments of the present disclosure further comprises an adjustment module; the rendering engine is further configured to acquire an original rendering model, in which the original rendering model comprises an original original-resolution sampling area and an original compression resolution sampling area; and the adjustment module is configured to, according to the gaze point position, adjust a center point position of the original original-resolution sampling area and a resolution compression multiple of the original compression resolution sampling area to determine the rendering model.

Some embodiments of the present disclosure also provide an image rendering system for virtual reality, including: a virtual reality device and the image rendering device described in any one of the above embodiments; the virtual reality device is configured to acquire the gaze point of the human eyes on the display screen of the virtual reality device and receive the output image transmitted by the image rendering device.

Some embodiments of the present disclosure also provide a computer readable storage medium which is stored a computer program, in a case where the computer program is executed by a processor, the image rendering method provided by any one of embodiments of the present disclosure is implemented.

Some embodiments of the present disclosure also provide a computer device comprising: a memory configured to store a computer program; and a processor configured to execute the computer program; in a case where the computer program is executed by the processor, the image rendering method provided by any one of embodiments of the present disclosure is implemented.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

Figure 1A:
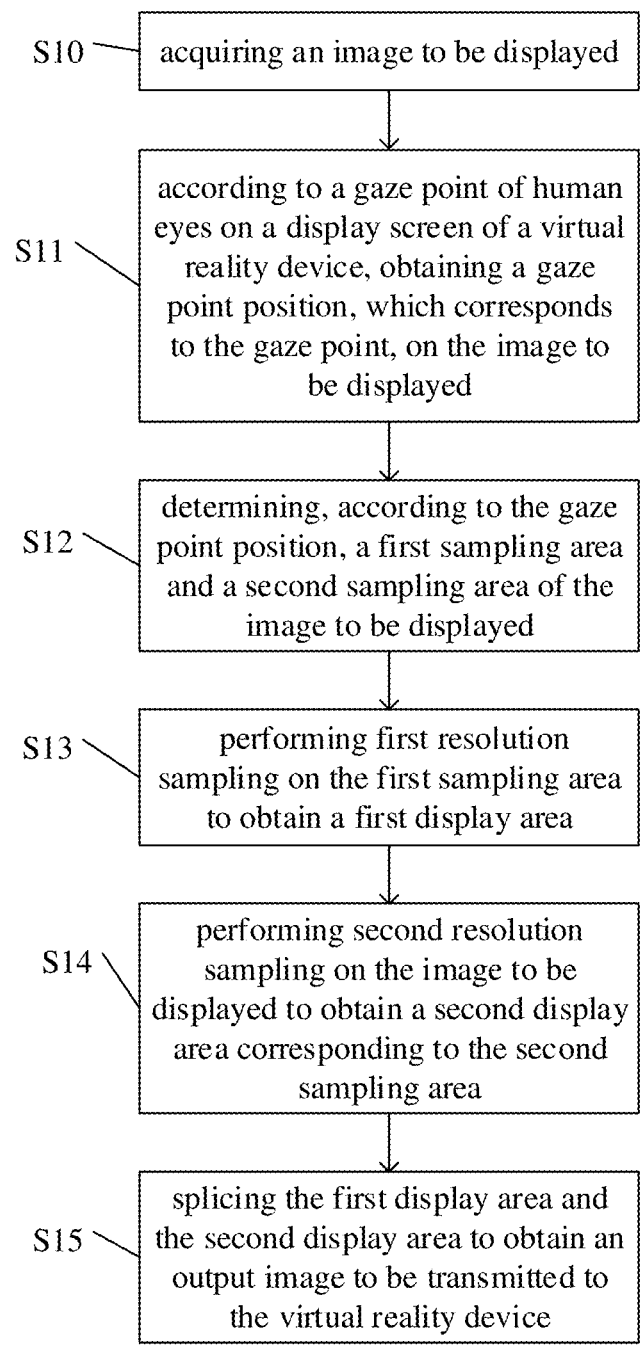
FIG. 1A shows a flowchart of an image rendering method for virtual reality provided by at least some embodiments of the present disclosure.

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "comprise," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may comprise an electrical connection, directly or indirectly. "On," "under," "right," "left" and the like are only used to indicate relative position relationship, and when the absolute position of the object which is described is changed, the relative position relationship may be changed accordingly.

In order to explain the present disclosure more clearly, the present disclosure will be further described below with reference to some embodiments of the present disclosure and the accompanying drawings. Similar components in the drawings are denoted by the same reference numerals. Those skilled in the art should understand that the following detailed description is illustrative rather than limiting, and should not be intended to limit the scope of protection of the present disclosure.

Figure 1B:
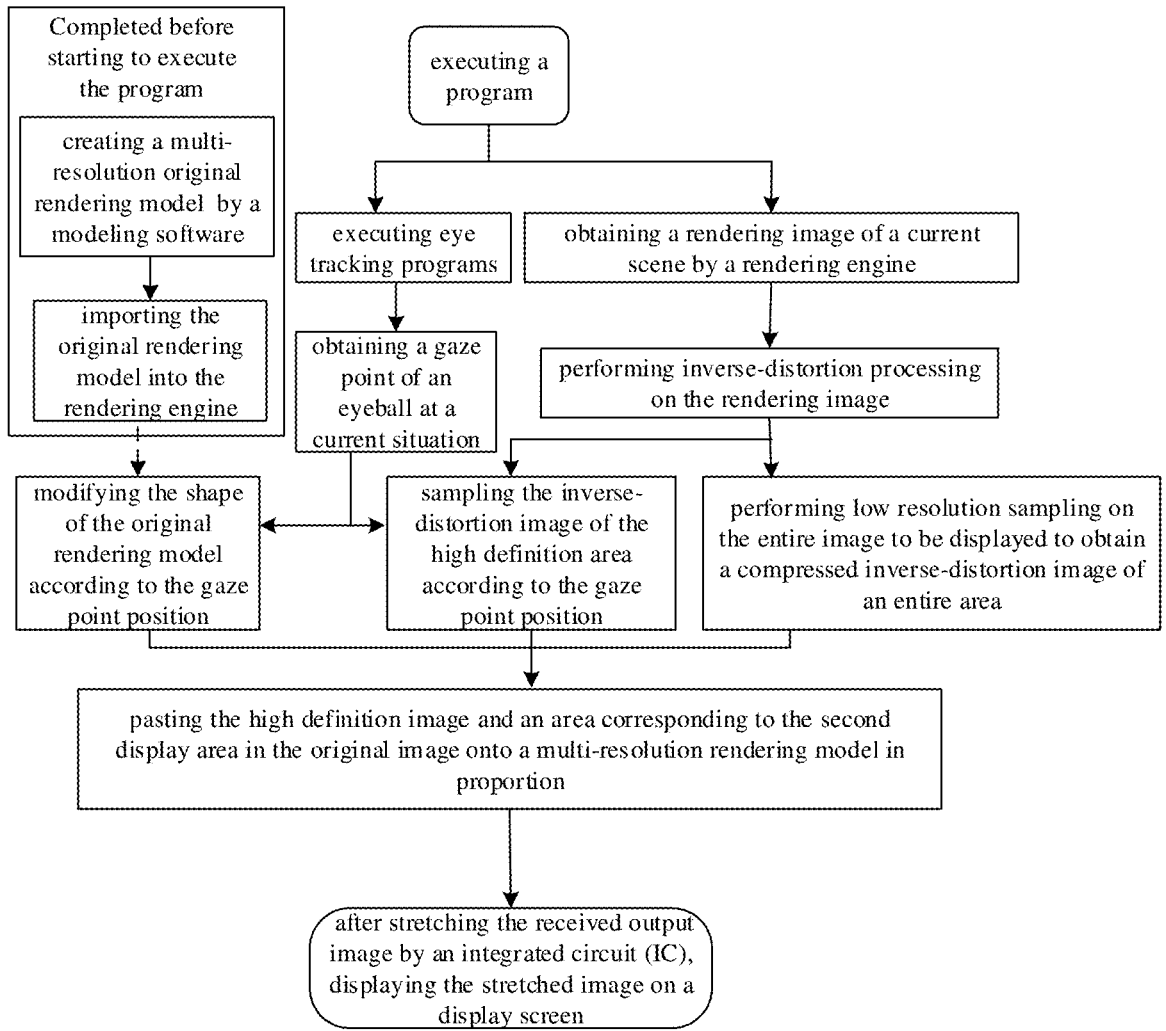
FIG. 1B shows another flowchart of an image rendering method for virtual reality provided by at least some embodiments of the present disclosure.
Figure 2A:
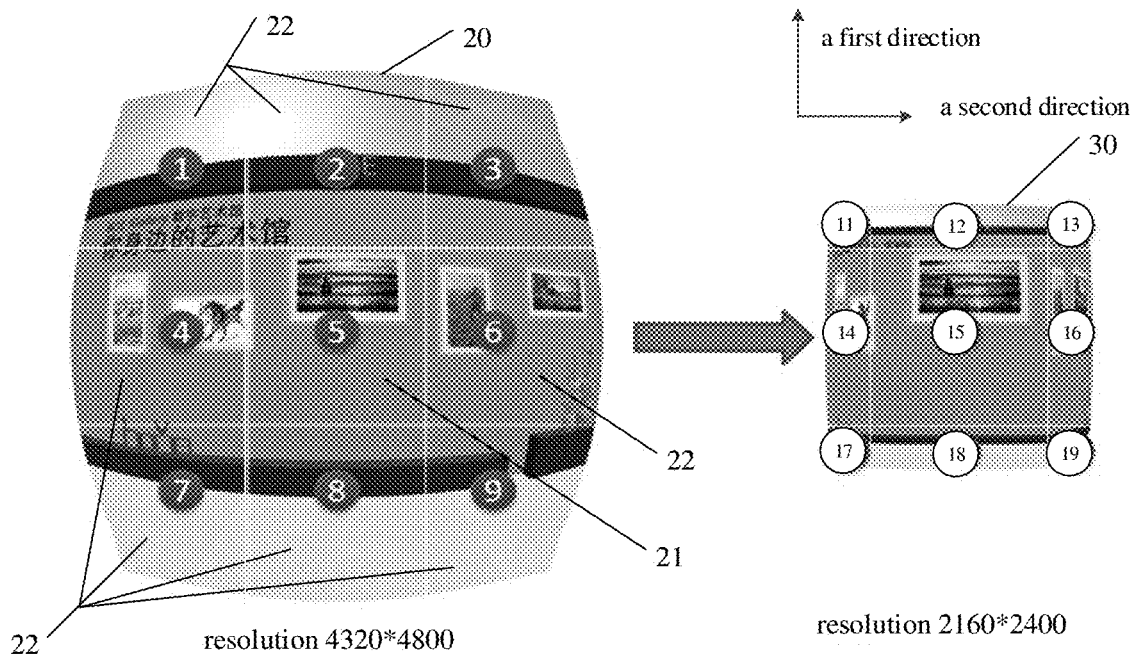
FIG. 2A shows an implementation principle diagram of a rendering process provided by at least some embodiments of the present disclosure.
Figure 2B:
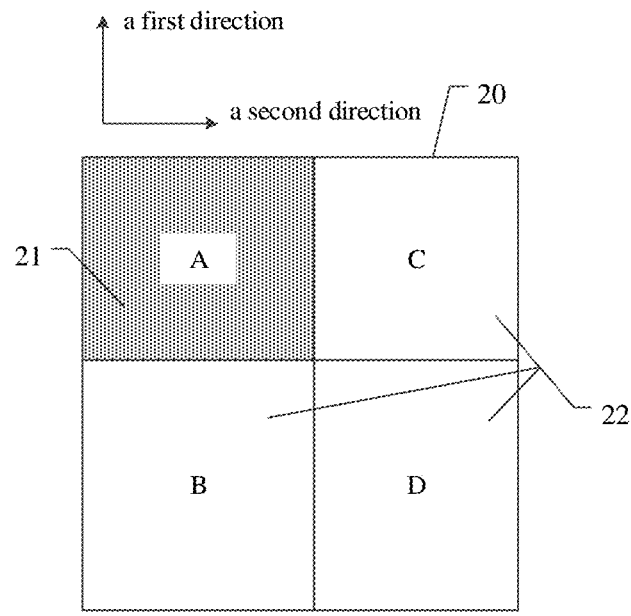
FIG. 2B shows a schematic diagram of a rendering model provided by at least some embodiments of the present disclosure.
Figure 3:
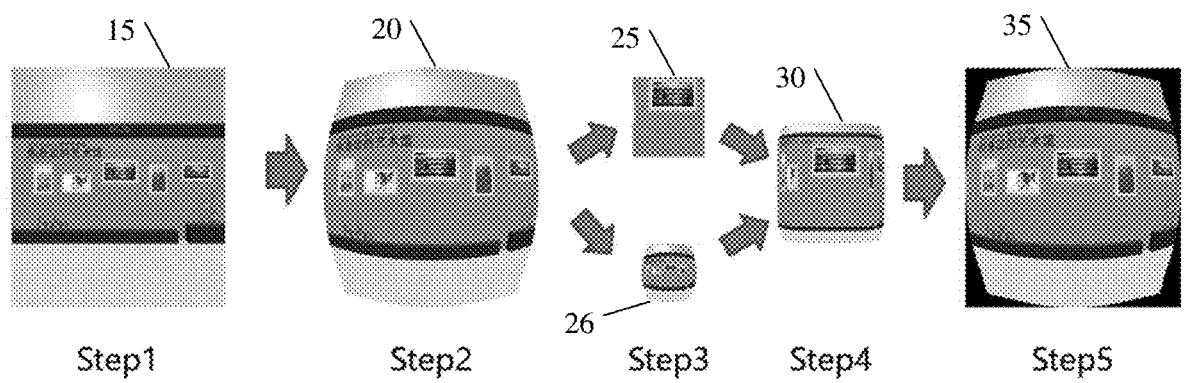
FIG. 3 shows a change process diagram of an image during a process of an image rendering method for virtual reality provided by at least some embodiments of the present disclosure.

FIG. 1A shows a flowchart of an image rendering method for virtual reality provided by at least some embodiments of the present disclosure; FIG. 1B shows another flowchart of an image rendering method for virtual reality provided by at least some embodiments of the present disclosure; FIG. 2A shows an implementation principle diagram of a rendering process provided by at least some embodiments of the present disclosure; FIG. 2B shows a schematic diagram of a rendering model provided by at least some embodiments of the present disclosure; and FIG. 3 shows a change process diagram of an image during a process of an image rendering method for virtual reality provided by at least some embodiments of the present disclosure.

Some embodiments of the present disclosure provide an image rendering method, the image rendering method can be applied to a virtual reality device. For example, as shown in FIG. 1B, some embodiments of the present disclosure provide an image rendering method for virtual reality, which includes:

according to a gaze point position of human eyes on a display screen of a virtual reality device, obtaining a position, which corresponds to a gaze point, on an image to be displayed on the display screen; in which obtaining the position of the gaze point on the display screen can be achieved by the virtual reality device, to which the display screen belongs, through a corresponding hardware or software based on gaze tracking technology;

loading a rendering model, in which the rendering model is preset with an original resolution sampling area, a compression resolution sampling area, and a transverse resolution compression multiple and/or a longitudinal resolution compression multiple of the compression resolution sampling area;

according to the position, which corresponds to the gaze point, on the image to be displayed on the display screen, adjusting a center point position of the original resolution sampling area and the transverse resolution compression multiple and/or the longitudinal resolution compression multiple of the compression resolution sampling area;

according to the rendering model which is adjusted, performing original resolution sampling on the original resolution sampling area of the image and performing compression resolution sampling on the compression resolution sampling area; and splicing the original resolution sampling area which is sampled and the compression resolution sampling area to obtain an image to be transmitted to the virtual reality device.

For example, as shown in FIG. 1A, other embodiments of the present disclosure provide an image rendering method for virtual reality, which includes:

S10: acquiring an image to be displayed;

S11: according to a gaze point of human eyes on a display screen of a virtual reality device, obtaining a gaze point position, which corresponds to the gaze point, on the image to be displayed;

S12: determining, according to the gaze point position, a first sampling area and a second sampling area of the image to be displayed;

S13: performing first resolution sampling on the first sampling area to obtain a first display area;

S14: performing second resolution sampling on the image to be displayed to obtain a second display area corresponding to the second sampling area;

S15: splicing the first display area and the second display area to obtain an output image to be transmitted to the virtual reality device.

The image rendering method for virtual reality provided by the embodiment of the present disclosure can be implemented in a rendering engine. By adjusting a rendering model in the rendering engine, an non-high definition area (i.e., a non-gaze point area) of the image can be compressed in the rendering engine, so that a transmission bandwidth output by a software terminal to the display device is reduced, the transmission bandwidth in the image transmission process can be saved, and a problem that the real-time display with high resolution and high refresh rate cannot be completed, because direct transmission of 4K images has too much pressure on hardware due to the limitation of the transmission bandwidth, is solved. And compared with a method of compressing images based on an algorithm, the image rendering method provided by the present disclosure has high real-time performance, fast calculation speed, small calculation resource consumption, and high calculation efficiency, and can achieve real-time display with high resolution and high refresh rate.

For example, in step S10, the image to be displayed may be acquired by the rendering engine. In some embodiments, step S10 may include: acquiring an original image; performing an inverse-distortion processing on the original image to obtain the image to be displayed. As shown in FIG. 1B, after starting to execute the program, the rendering engine can obtain a rendering image, i.e. the original image, of a current scene, and then, the rendering engine can also perform the inverse-distortion processing on the rendering image to obtain the image to be displayed, that is, the image to be displayed is an inverse-distortion image.

In a case where the image rendering method is applied to the virtual reality device, especially a virtual reality head-mounted display device, because the display screen of the virtual reality device is usually equipped with lenses, in order to display normally, the inverse-distortion processing needs to be performed on the image. By adding the above step of performing the inverse-distortion processing to the image rendering method for virtual reality provided by this embodiment, it can be achieved that the method is applied to the image transmission from a computer device to the virtual reality device.

For example, a size of the image to be displayed may be identical to a size of the original image.

For example, the original image may be a color image or a grayscale image. For example, the original image may have various shapes, such as rectangle, circle, trapezoid, etc. An embodiment of the present disclosure will be described below by taking a case that both the original image and the image to be displayed have a rectangular shape as an example.

For example, in step S11, the position, which corresponds to the gaze point, on the image to be displayed on the display screen is obtained according to the gaze point position of the human eyes on the display screen of the virtual reality device. For example, obtaining the gaze point position of the gaze point on the display screen can be implemented by the virtual reality device, to which the display screen belongs, through a corresponding hardware or software based on the gaze tracking technology. The virtual reality device can track the line of sight of the human eyes according to the changes in characteristics of the eyeball and the periphery of the eyeball. The virtual reality device can also track the line of sight of the human eyes according to changes of an iris angle. The virtual reality device can also actively project infrared rays or other light beams to the iris to extract eyeball features, thereby achieving to track the line of sight of the human eyes.

For example, in some examples, the virtual reality device implements to track the line of sight of the human eyes through a corresponding software based on the gaze tracking technology. As shown in FIG. 1B, after the program is started to be executed, the virtual reality device can execute gaze tracking programs to obtain a gaze point of an eyeball at a current situation.

For example, in step S12, a size of the first sampling area can be preset by users, and during a process of executing the program, the size of the first sampling area remains unchanged for different images to be displayed.

For example, the second sampling area may be determined according to the gaze point position and the size of the first sampling area.

For example, in steps S13 and S14, performing the first resolution sampling on the first sampling area and performing the second resolution sampling on the image to be displayed includes: loading a rendering model according to the gaze point position, i.e., determining the rendering model, in which the rendering model includes an original resolution sampling area, a compression resolution sampling area, and a resolution compression multiple of the compression resolution sampling area, the original resolution sampling area corresponds to the first sampling area, and the compression resolution sampling area corresponds to the second sampling area; and according to the rendering model, performing the first resolution sampling on the first sampling area and performing the second resolution sampling on the image to be displayed.

For example, in steps S13 and S14, a resolution of the first sampling area is equal to a resolution of the first display area, that is, a size of the first display area is identical to a size of the first sampling area. A resolution of the second sampling area is greater than a resolution of the second display area, that is, a size of the second sampling area is greater than a size of the second display area. That is, in steps S13 and S14, the first display area can be obtained by performing original resolution sampling on the first sampling area, and the second display area can be obtained by performing compression resolution sampling on the second sampling area.

For example, the compression resolution sampling can be implemented by an interpolation algorithm. The interpolation algorithm includes, for example, Lagrange interpolation, Newton interpolation, Hermite interpolation, etc.

For example, as shown in FIG. 1B, the inverse distortion image (i.e., the image to be displayed) of a high definition area (i.e., the first sampling area) may be sampled according to the gaze point position. Low resolution sampling may be performed on the entire image to be displayed to obtain an inverse distortion image, which is compressed, of an entire area (i.e., an area of the entire image to be displayed).

For example, as shown in FIG. 2A, in some embodiments, a resolution of the image to be displayed 20 may be 4320*4800. A resolution of the output image 30 obtained by processing the image to be displayed 20 according to the embodiment of the present disclosure is 2160*2400.

For example, the output image 30 includes a first display area and a second display area. As shown in FIG. 2A, in some examples, the output image 30 includes nine output sub-areas, the first display area is an output sub-area 15, and the second display area includes eight output sub-areas, that is, the second display area may include an output sub-area 11, an output sub-area 12, an output sub-area 13, an output sub-area 14, an output sub-area 16, an output sub-area 17, an output sub-area 18, and an output sub-area 19.

For example, the output sub-area 15 of the output image 30 corresponds to a sub-area to be displayed 5 of the image to be displayed 20, the output sub-area 11 of the output image 30 corresponds to a sub-area to be displayed 1 of the image to be displayed 20, the output sub-area 12 of the output image 30 corresponds to a sub-area to be displayed 2 of the image to be displayed 20, the output sub-area 13 of the output image 30 corresponds to a sub-area to be displayed 3 of the image to be displayed 20, the output sub-area 14 of the output image 30 corresponds to a sub-area to be displayed 4 of the image to be displayed 20, the output sub-area 16 of the output image 30 corresponds to a sub-area to be displayed 6 of the image to be displayed 20, the output sub-area 17 of the output image 30 corresponds to a sub-area to be displayed 7 of the image to be displayed 20, the output sub-area 18 of the output image 30 corresponds to a sub-area to be displayed 8 of the image to be displayed 20, and the output sub-area 19 of the output image 30 corresponds to a sub-area to be displayed 9 of the image to be displayed 20. A resolution of the output sub-area 15 of the output image 30 is identical to a resolution of the sub-area to be displayed 5 of the image to be displayed 20. A resolution of each output sub-area in the second display area is smaller than a resolution of a corresponding sub-area to be displayed in the second sampling area. For example, a resolution of the output sub-area 11 of the output image 30 is less than a resolution of the sub-area to be displayed 1 of the image to be displayed 20.

For example, the image to be displayed 20 has a rectangular shape, the first sampling area may be located at any corner of the rectangle, and the first sampling area may be located at any edge of the rectangle; alternatively, the first sampling area may also be located at the middle of the rectangle, that is, the first sampling area is not in contact with the edges and corners of the image to be displayed 20. The embodiments of the present disclosure do not limit the specific position of the second sampling area.

For example, the second sampling area may include a plurality of sub-areas to be displayed.

For example, as shown in FIG. 2A, in some examples, the first sampling area 21 may be located at the middle of the image to be displayed, in this case, the image to be displayed 20 is divided into nine sub-areas to be displayed, the first sampling area 21 is the sub-area to be displayed 5, and the second sampling area 22 includes eight sub-areas to be displayed, that is, the second sampling area 22 may include the sub-area to be displayed 1, the sub-area to be displayed 2, the sub-area to be displayed 3, the sub-area to be displayed 4, the sub-area to be displayed 6, the sub-area to be displayed 7, the sub-area to be displayed 8, and the sub-area to be displayed 9. The first sampling area 21 and the second sampling area 22 form a nine-grid structure, the nine-grid structure includes a plurality of areas arranged in three rows and three columns, and the first sampling area 21 is located at a center of the nine-grid structure, namely, the first sampling area 21 is located in a second row and a second column of the nine-grid structure.

It is worth noting that each sub-area to be displayed can be further divided.

For example, as shown in FIG. 2A, the sub-area to be displayed 1, the sub-area to be displayed 3, the sub-area to be displayed 7, and the sub-area to be displayed 9 of the second sampling area 22 are not adjacent to the first sampling area 21 (i.e., the sub-area to be displayed 5), the sub-area to be displayed 4 and the sub-area to be displayed 6 of the second sampling area 22 are adjacent to the first sampling area 21 in a second direction, and the sub-area to be displayed 2 and the sub-area to be displayed 8 of the second sampling area 22 are adjacent to the first sampling area 21 in a first direction.

For example, the first direction and the second direction are perpendicular to each other.

For example, as shown in FIG. 2B, in other examples, the first sampling area 21 is located at any corner of the rectangle. At this time, as shown in FIG. 2B, the image to be displayed 20 can be divided into four sub-areas to be displayed, the first sampling area 21 is a sub-area to be displayed A, and the second sampling area 22 includes three sub-areas to be displayed, that is, the second sampling area 22 may include a sub-area to be displayed B, a sub-area to be displayed C, and a sub-area to be displayed D. However, the present disclosure is not limited to this case. The first sampling area 21 may also be the sub-area to be displayed C, and accordingly, the second sampling area 21 includes the sub-area to be displayed A, the sub-area to be displayed B, and the sub-area to be displayed D.

For example, as shown in FIG. 2B, the sub-area to be displayed B of the second sampling area 22 is adjacent to the first sampling area 21 (i.e., the sub-area to be displayed A) in the first direction, the sub-area to be displayed C of the second sampling area 22 is adjacent to the first sampling area 21 in the second direction, and the sub-area to be displayed D of the second sampling area 22 is not adjacent to the first sampling area 21.

It should be noted that in the present disclosure, the term "adjacent" may mean that the sub-area to be displayed (e.g., the sub-area to be displayed B and the sub-area to be displayed C as shown in FIG. 2B) in the second sampling area 22 is adjacent to at least one edge of the first sampling area 21. The term "not adjacent" means that the sub-area to be displayed (e.g., the sub-area to be displayed D as shown in FIG. 2B) in the second sampling area 22 is not adjacent to either edge of the first sampling area 21.

For example, step S14 may include: according to the rendering model, performing the second resolution sampling on the image to be displayed to obtain an intermediate image to be displayed; and according to a positional relationship between the first sampling area and the second sampling area and a proportional relationship between the first sampling area and the second sampling area, dividing the intermediate image to be displayed to obtain a first intermediate display area corresponding to the first sampling area and a second intermediate display area corresponding to the second sampling area. The second display area includes the second intermediate display area.

For example, as shown in FIG. 3, in step3, the second resolution sampling is performed on the image to be displayed 20 to obtain the intermediate image to be displayed 26. The intermediate image to be displayed 26 is an image obtained by compressing the entire image to be displayed 20, and then, the intermediate image to be displayed 26 can be divided according to the positional relationship between the first sampling area and the second sampling area and the proportional relationship between the first sampling area and the second sampling area. For example, for the example shown in FIG. 2A, that is, in a case where the second sampling area includes the sub-area to be displayed 1, the sub-area to be displayed 2, the sub-area to be displayed 3, the sub-area to be displayed 4, the sub-area to be displayed 6, the sub-area to be displayed 7, the sub-area to be displayed 8, and the sub-area to be displayed 9, and the first sampling area is the sub-area to be displayed 5, the intermediate image to be displayed 26 can also be divided into nine intermediate sub-areas, and the nine intermediate sub-areas are arranged in three rows and three columns. The first intermediate display area includes an intermediate sub-area located in a second column and a second row, the second intermediate display area includes eight intermediate sub-areas, and the eight intermediate sub-areas are in one-to-one correspondence with the eight sub-areas to be displayed of the second sampling area. For example, an intermediate sub-area, which is located in a first column and a first row, of the second intermediate display area corresponds to the sub-area to be displayed 1 of the second sampling area, that is, both a position of the intermediate sub-area, which is located in the first column and the first row, of the second intermediate display area in the intermediate image to be displayed 26 and a proportional relationship between the intermediate sub-area which is located in the first column and the first row and the remaining intermediate sub-areas are identical to a position of the sub-area to be displayed 1 of the second sampling area in the image to be displayed 20 and a proportional relationship between the sub-area to be displayed 1 and the remaining sub-areas to be displayed.

Figure 4A:
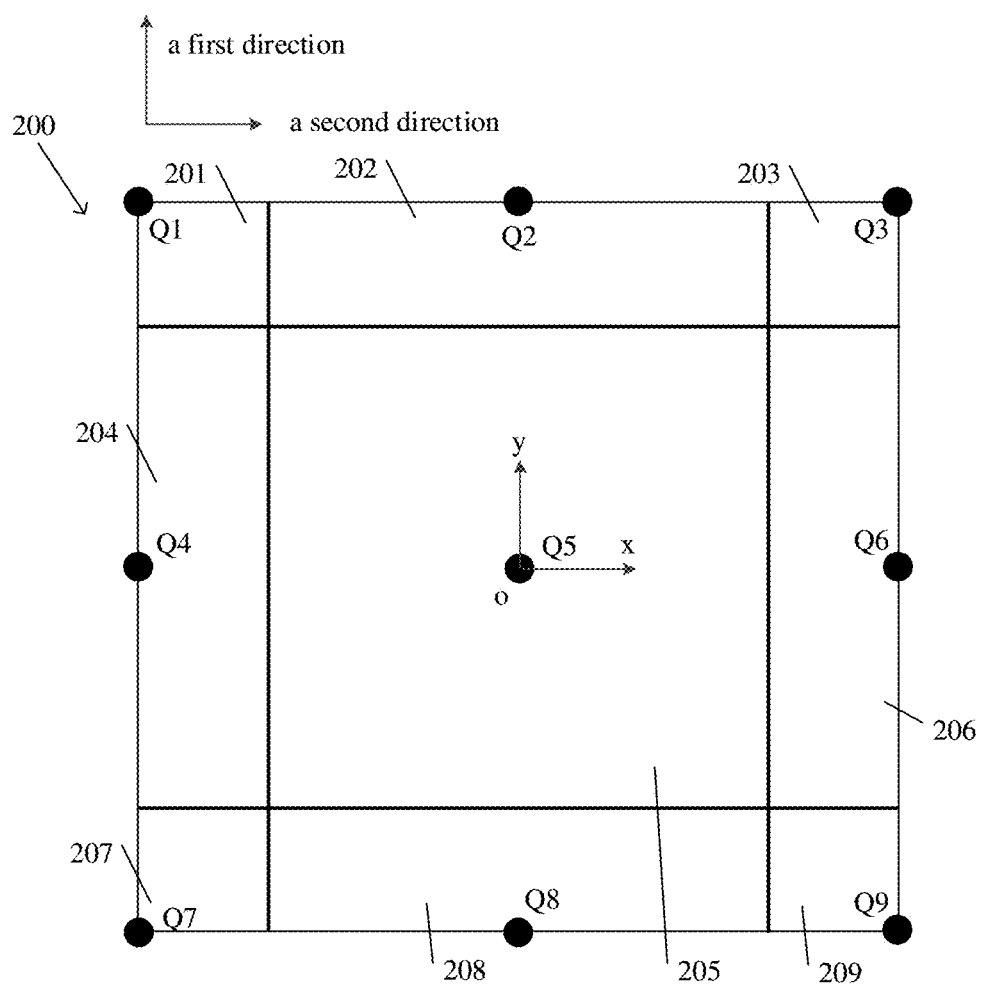
FIG. 4A shows a schematic diagram of an original rendering model provided by some embodiments of the present disclosure.
Figure 4B:
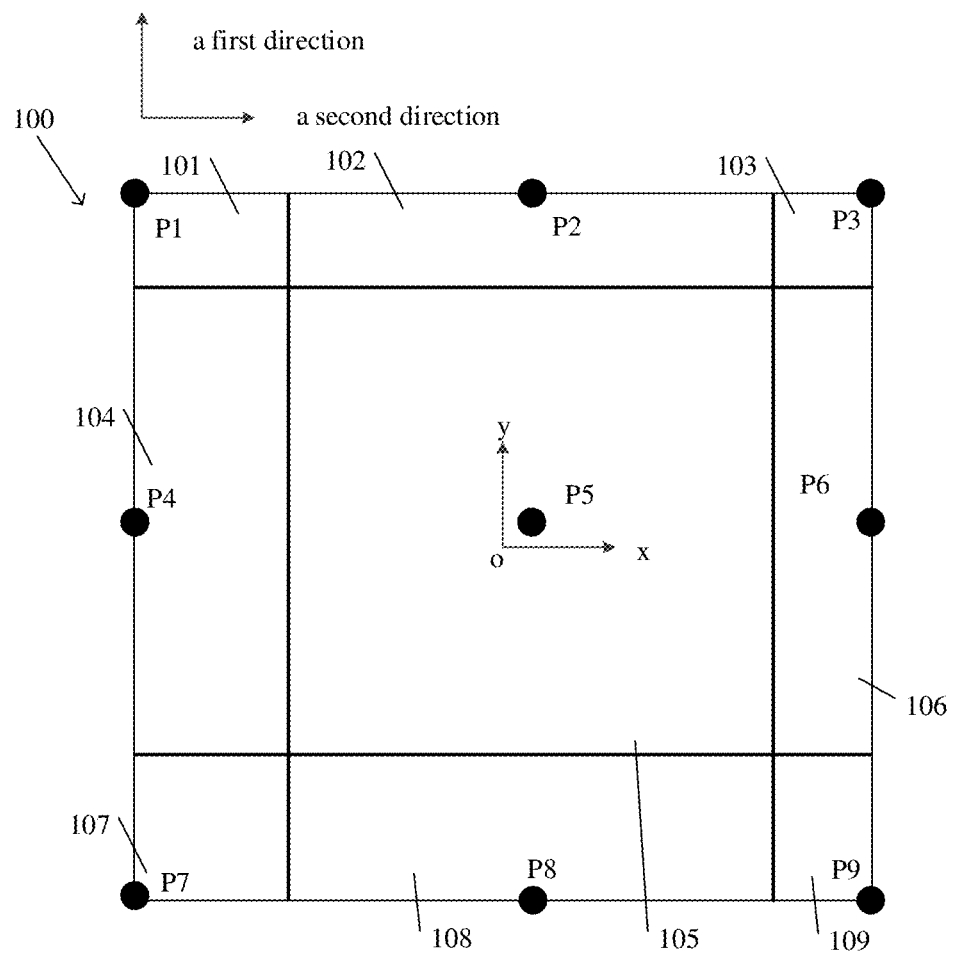
FIG. 4B shows a schematic diagram of a rendering model provided by some embodiments of the present disclosure.

FIG. 4A is a schematic diagram of an original rendering model provided by some embodiments of the present disclosure; and FIG. 4B is a schematic diagram of a rendering model provided by some embodiments of the present disclosure.

For example, in some embodiments, in step S15, in a case where the rendering model is determined, the first display area is placed at a position corresponding to the original resolution sampling area and the second display area is placed at a position corresponding to the compression resolution sampling area, thereby obtaining the output image. For example, as shown in FIG. 1B, the high definition image (i.e., the first display area) and an area, which corresponds to the second display area, in the original image are pasted onto a multi-resolution rendering model in proportion to obtain the output image.

For example, determining the rendering model according to the gaze point position includes: acquiring an original rendering model, in which the original rendering model includes an original original-resolution sampling area and an original compression resolution sampling area; and according to the gaze point position, adjusting a center point position of the original original-resolution sampling area and a resolution compression multiple of the original compression resolution sampling area to obtain the rendering model.

For example, as shown in FIG. 1B, before starting to execute the program, a multi-resolution original rendering model can be created by a modeling software, and then the original rendering model can be imported into the rendering engine for subsequent use. In the process of executing the program, the rendering engine can modify a shape of the original rendering model according to the gaze point position to obtain a required rendering model. For example, modifying the shape of the original rendering model may include adjusting the center point position of the original original-resolution sampling area and a resolution compression multiple of the original compression resolution sampling area. For example, the shape of the rendering model and the shape of the original rendering model can also be rectangular.

For example, a size of the rendering model is identical to a size of the original rendering model. The size of the rendering model is also identical to the size of the output image.

For example, in some alternative implementations of this embodiment, the resolution compression multiple of the original compression resolution sampling area may be preset and adjusted according to a positional relationship between the original compression resolution sampling area and the original original-resolution sampling area.

For example, the resolution compression multiple of the compression resolution sampling area may include a transverse resolution compression multiple and/or a longitudinal resolution compression multiple. For example, as shown in FIGS. 4A and 4B, the longitudinal resolution compression multiple may represent a resolution compression multiple in the first direction, and the transverse resolution compression multiple may represent a resolution compression multiple in the second direction.

It should be noted that in the embodiment of the present disclosure, in a case where the resolution compression multiple is greater than 1, it means that the original compression resolution sampling area is compressed; and in a case where the resolution compression multiple is less than 1, it means that the original compression resolution sampling area is stretched.

For example, in the rendering model, the original resolution sampling area corresponds to an area corresponding to the position of the gaze point on the image to be displayed, and the other area that the user does not pay attention to (i.e. non-gaze area) is set as the compression resolution sampling area. That is, the original resolution sampling area corresponds to the first display area of the output image, i.e., the original resolution sampling area corresponds to the output sub-area 15 as shown in FIG. 2A, and the compression resolution sampling area corresponds to the second display image of the output image, i.e., the output sub-area 11, the output sub-area 12, the output sub-area 13, the output sub-area 14, the output sub-area 16, the output sub-area 17, the output sub-area 18, and the output sub-area 19 as shown in FIG. 2A. In order to ensure that the virtual camera performs original resolution sampling on the original resolution sampling area of the image, in a case of presetting and adjusting the transverse resolution compression multiple and the longitudinal resolution compression multiple of each compression resolution sampling area, it is necessary to consider the positional relationship between each compression resolution sampling area and the original resolution sampling area, so as to achieve normal resolution compression of a local image and to ensure that the shape of the entire image, which is compressed, is identical to the shape of the original image (for example, the original image is a rectangular image, and the image, which is compressed, is also a rectangular image).

For example, a size of the original compression resolution sampling area, a size of the original resolution sampling area, the size of the first display area, and the size of the first sampling area are all identical.

For example, in some alternative implementations of this embodiment, the original resolution sampling area and the compression resolution sampling area form a nine-grid structure. For example, the original resolution sampling area is located in a middle grid of the nine-grid. Such a rule facilitates to adjust the center point position of the original resolution sampling area and the transverse resolution compression multiple and/or the longitudinal resolution compression multiple of the compression resolution sampling area. In addition, in this case, the original resolution sampling area corresponds to the gaze point more accurately.

For example, as shown in FIG. 4B, in some examples, the rendering model 100 includes nine sampling sub-areas, and the nine sampling sub-areas are arranged in three rows and three columns, i.e., the original resolution sampling area and the compression resolution sampling area form a nine-grid structure, and the nine-grid structure includes nine sampling sub-areas arranged in three rows and three columns. The original resolution sampling area is located in the middle grid of the nine-grid, that is, the original resolution sampling area is located in a second row and a second column of the nine-grid structure. In the example shown in FIG. 4B, the original resolution sampling area includes the sampling sub-area 105, that is, the sampling sub-area 105 is the original resolution sampling area; and the compression resolution sampling area includes eight sampling sub-areas, namely, the compression resolution sampling area includes a sampling sub-area 101, a sampling sub-area 102, a sampling sub-area 103, a sampling sub-area 104, a sampling sub-area 106, a sampling sub-area 107, a sampling sub-area 108, and a sampling sub-area 109.

For example, each of the sampling sub-area 101, the sampling sub-area 103, the sampling sub-area 107, and the sampling sub-area 109 may have a transverse resolution compression multiple and a longitudinal resolution compression multiple, that is, each of the sampling sub-area 101, the sampling sub-area 103, the sampling sub-area 107, and the sampling sub-area 109 may be compressed in the first direction and the second direction. The sampling sub-area 102 and the sampling sub-area 108 may only have a longitudinal resolution compression multiple, that is, in the first direction, the sampling sub-area 102 and the sampling sub-area 108 may be compressed, while in the second direction, the sampling sub-area 102 and the sampling sub-area 108 are not compressed. The sampling sub-area 104 and the sampling sub-area 106 may only have a transverse resolution compression multiple, that is, in the first direction, the sampling sub-area 104 and the sampling sub-area 106 are not compressed, while in the second direction, the sampling sub-area 104 and the sampling sub-area 106 may be compressed.

For example, the longitudinal resolution compression multiple of the sampling sub-area 101, the longitudinal resolution compression multiple of the sampling sub-area 102, and the longitudinal resolution compression multiple of the sampling sub-area 103 are all identical. The longitudinal resolution compression multiple of the sampling sub-area 107, the longitudinal resolution compression multiple of the sampling sub-area 108, and the longitudinal resolution compression multiple of the sampling sub-area 109 are also identical.

For example, the transverse resolution compression multiple of the sampling sub-area 101, the transverse resolution compression multiple of the sampling sub-area 104, and the transverse resolution compression multiple of the sampling sub-area 107 are all identical. The transverse resolution compression multiple of the sampling sub-area 103, the transverse resolution compression multiple of the sampling sub-area 106, and the transverse resolution compression multiple of the sampling sub-area 109 are also identical.

For example, as shown in FIG. 4A, the original rendering model 200 may include nine original sampling sub-areas, and the nine original sampling sub-areas are an original sampling sub-area 201, an original sampling sub-area 202, an original sampling sub-area 203, an original sampling sub-area 204, an original sampling sub-area 205, an original sampling sub-area 206, an original sampling sub-area 207, an original sampling sub-area 108, and an original sampling sub-area 209. Moreover, the nine original sampling sub-areas are arranged in three rows and three columns, namely, the original original-resolution sampling area and the original compression resolution sampling area can also form a nine-grid structure, and the original original-resolution sampling area is located in a middle grid of the nine-grid, namely, the original original-resolution sampling area is an original sampling sub-area 205 located in a second row and the second column of the nine-grid. The original compression resolution sampling area includes eight original sampling sub-areas, namely, an original sampling sub-area 201, an original sampling sub-area 202, an original sampling sub-area 203, an original sampling sub-area 204, an original sampling sub-area 206, an original sampling sub-area 207, an original sampling sub-area 208, and an original sampling sub-area 209.

For example, the original sampling sub-areas of the original compression resolution sampling area are in one-to-one correspondence to the sampling sub-areas of the compression resolution sampling area. For example, the original sampling sub-area 201 located in a first column and a first row in the original compression resolution sampling area corresponds to the sampling sub-area 101 located in a first column and a first row in the compression resolution sampling area, the original sampling sub-area 202 located in a second column and a first row in the original compression resolution sampling area corresponds to the sampling sub-area 102 located in a second column and a first row in the compression resolution sampling area, and so on.

For example, the original original-resolution sampling area corresponds to the original resolution sampling area, and a size of the original original-resolution sampling area is identical to a size of the original resolution sampling area. That is, the original sampling sub-area 205 as shown in FIG. 4A corresponds to and is identical to the sampling sub-area 105 as shown in FIG. 4B.

For example, a shape of the original original-resolution sampling area and a shape of the original resolution sampling area may both be rectangles.

For example, as shown in FIG. 4A, a center of the original original-resolution sampling area 205 coincides with a center of the original rendering model. However, as shown in FIG. 4B, the center of the original resolution sampling area 105 does not coincide with the center of the rendering model.

For example, in some alternative implementations of this embodiment, adjusting the center point position of the original resolution sampling area includes:

in a case where a center point of the original resolution sampling area is the gaze point position, judging whether the original resolution sampling area exceeds a boundary of the image to be displayed:

if not, adjusting the center point of the original resolution sampling area to be the gaze point position;

if yes, adjusting the center point of the original resolution sampling area to be a position closest to the gaze point position in a case where the original resolution sampling area does not exceed the boundary of the image to be displayed.

It should be noted that in the preset of the rendering model, the center point position of the original resolution sampling area corresponds to the center point position of the entire model. In a case where the center point position of the original resolution sampling area is adjusted to deviate from the center point position of the entire model according to the gaze point, the transverse and/or longitudinal resolution compression multiples of the compression resolution sampling area will be adjusted accordingly.

Figure 5A:
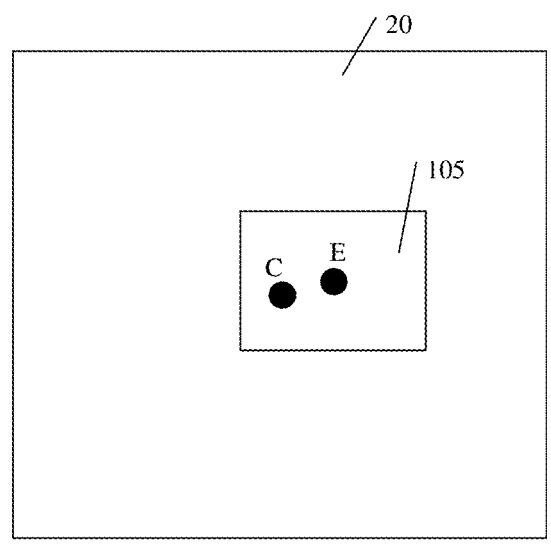
FIG. 5A is a schematic diagram of a positional relationship between a gaze point position and an original resolution sampling area on an image to be displayed provided by some embodiments of the present disclosure.
Figure 5B:
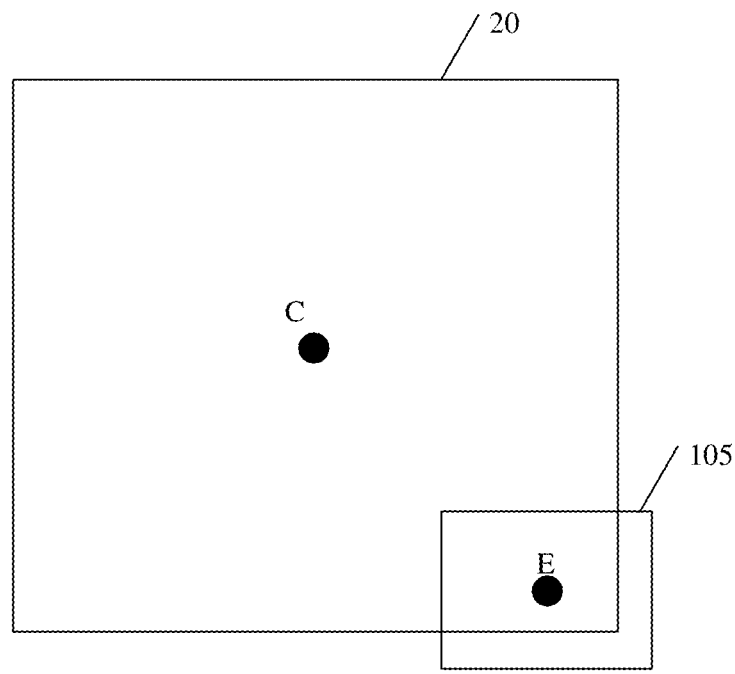
FIG. 5B is a schematic diagram of another positional relationship between a gaze point position and an original resolution sampling area provided by some embodiments of the present disclosure.
Figure 5C:
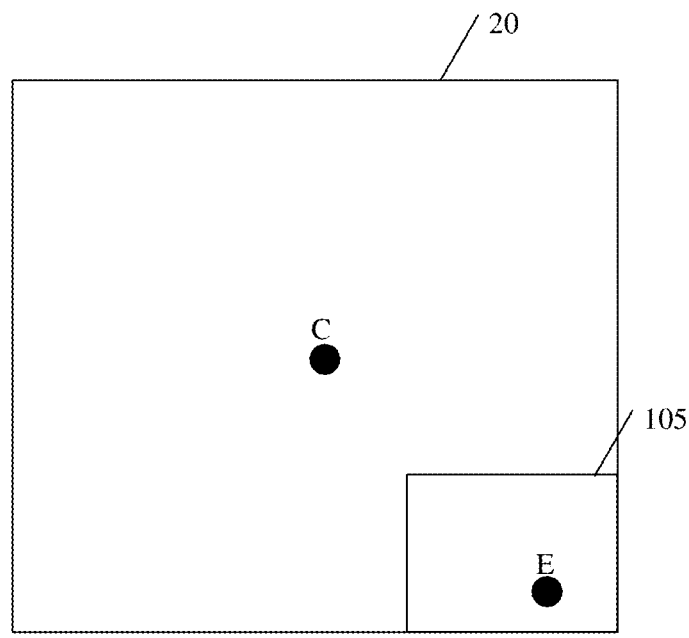
FIG. 5C is a schematic diagram of a center of an original resolution sampling area after being adjusted provided by some embodiments of the present disclosure.

FIG. 5A is a schematic diagram of a positional relationship between a gaze point position and an original resolution sampling area on an image to be displayed provided by some embodiments of the present disclosure; FIG. 5B is a schematic diagram of another positional relationship between a gaze point position and an original resolution sampling area provided by some embodiments of the present disclosure; and FIG. 5C is a schematic diagram of a center of an original resolution sampling area after being adjusted provided by some embodiments of the present disclosure.

For example, as shown in FIG. 5A, in some examples, on the image to be displayed 20, the gaze point position is shown as a point E. In a case where the center point of the original resolution sampling area 105 coincides with the gaze point position E, the original resolution sampling area 105 does not exceed the boundary of the image to be displayed 20, at this time, the center point of the original resolution sampling area 105 is the gaze point position E.

It should be noted that in the embodiment of the present disclosure, the center of the original compression resolution sampling area of the original rendering model coincides with the center of the original rendering model, and the center of the original rendering model corresponds to the center of the image to be displayed.

For example, as shown in FIG. 5A, the gaze point position E does not coincide with the center point C of the image to be displayed 20, and relative to the center point C of the image to be displayed 20, the gaze point position E is closer to a boundary on a right edge of the image to be displayed 20 and is closer to a boundary on a upper edge of the image to be displayed 20. For example, in FIG. 5A, the center of the original original-resolution sampling area 205 may be the center point C of the image to be displayed 20, and the center of the original resolution sampling area 105 is the gaze point position E. In this case, three original sampling sub-areas located in the first row of the original rendering model are compressed in a longitudinal direction, three original sampling sub-areas located in a third row of the original rendering model are stretched in the longitudinal direction, three original sampling sub-areas located in a third column of the original rendering model are compressed in a transverse direction, and three original sampling sub-areas located in a first column of the original rendering model are stretched in the transverse direction. As shown in FIG. 4B, the rendering model can be obtained after the above adjustments are performed on the original rendering model. For example, the original sampling sub-area 201 as shown in FIG. 4A is compressed in the first direction and stretched in the second direction, so that the sampling sub-area 101 as shown in FIG. 4B can be obtained, that is, in the first direction, a length of the original sampling sub-area 201 is less than a length of the sampling sub-area 101, while in the second direction, a length of the original sampling sub-area 201 is larger than a length of the sampling sub-area 101. At this time, the rendering model can still include nine sampling sub-areas.

For example, in the example shown in FIG. 5A, the first sampling area of the image to be displayed 20 is the sampling sub-area 105, so that the center point of the first sampling area 105 is the gaze point position E.

It is worth noting that the rendering model may only include four or six sampling sub-areas.

For example, as shown in FIG. 5B, in other examples, on the image to be displayed 20, the gaze point position is indicated by a point C. In a case where the center point of the original resolution sampling area 105 coincides with the gaze point position E, the original resolution sampling area 105 exceeds the boundary of the image to be displayed 20, for example, the original resolution sampling area 105 exceeds the boundary of the right edge and the boundary of the lower edge of the image to be displayed 20, that is, the gaze point position E is located at a right lower corner of the image to be displayed 20 with respect to the center point C of the image to be displayed 20. In this case, it is necessary to adjust the center point of the original resolution sampling area 105. In a case where the original resolution sampling area 105 does not exceed the boundary of the image to be displayed 20, the position closest to the gaze point position E is the center point of the original resolution sampling area 105. For example, as shown in FIG. 5C, in a case where two adjacent edges of the original resolution sampling area 105 respectively coincide with two adjacent edges (i.e., an edge of the right edge and an edge of the lower edge) of the image to be displayed 20, the position of the center point of the original resolution sampling area 105 is the position closest to the gaze point position E in a case where the original resolution sampling area 105 does not exceed the boundary of the image to be displayed 20.

For example, in FIG. 5C, two adjacent edges of the original resolution sampling area 105 respectively coincide with two adjacent edges of the image to be displayed 20, i.e., the first sampling area corresponding to the original resolution sampling area 105 may be located in a corner (lower right corner) of the rectangle. At this time, the rendering model may include four sampling sub-areas, that is, an area of the sampling sub-area 103, an area of the sampling sub-area 107, an area of the sampling sub-area 108, and an area of the sampling sub-area 109 as shown in FIG. 4B are all zero. In this case, two original sampling sub-areas (i.e., the original sampling sub-area 201 and the original sampling sub-area 202 as shown in FIG. 4A) located in the first row and the first column and in the first row and the second column in the original rendering model are stretched in the longitudinal direction (i.e., the first direction). Two original sampling sub-areas (i.e., the original sampling sub-area 201 and the original sampling sub-area 204 as shown in FIG. 4A) located in the first row and the first column and in the second row and the first column in the original rendering model are stretched in the transverse direction, and the rendering model can be obtained after performing the above-mentioned adjustment on the original rendering model.

It should be noted that in a case where the rendering model includes nine sampling sub-areas, a total area of the nine sampling sub-areas is SW, and in a case where the rendering model includes four sampling sub-areas, a total area of the four sampling sub-areas is also SW, that is, the size of the rendering model does not change with an amount of sampling sub-areas.

Figure 6:
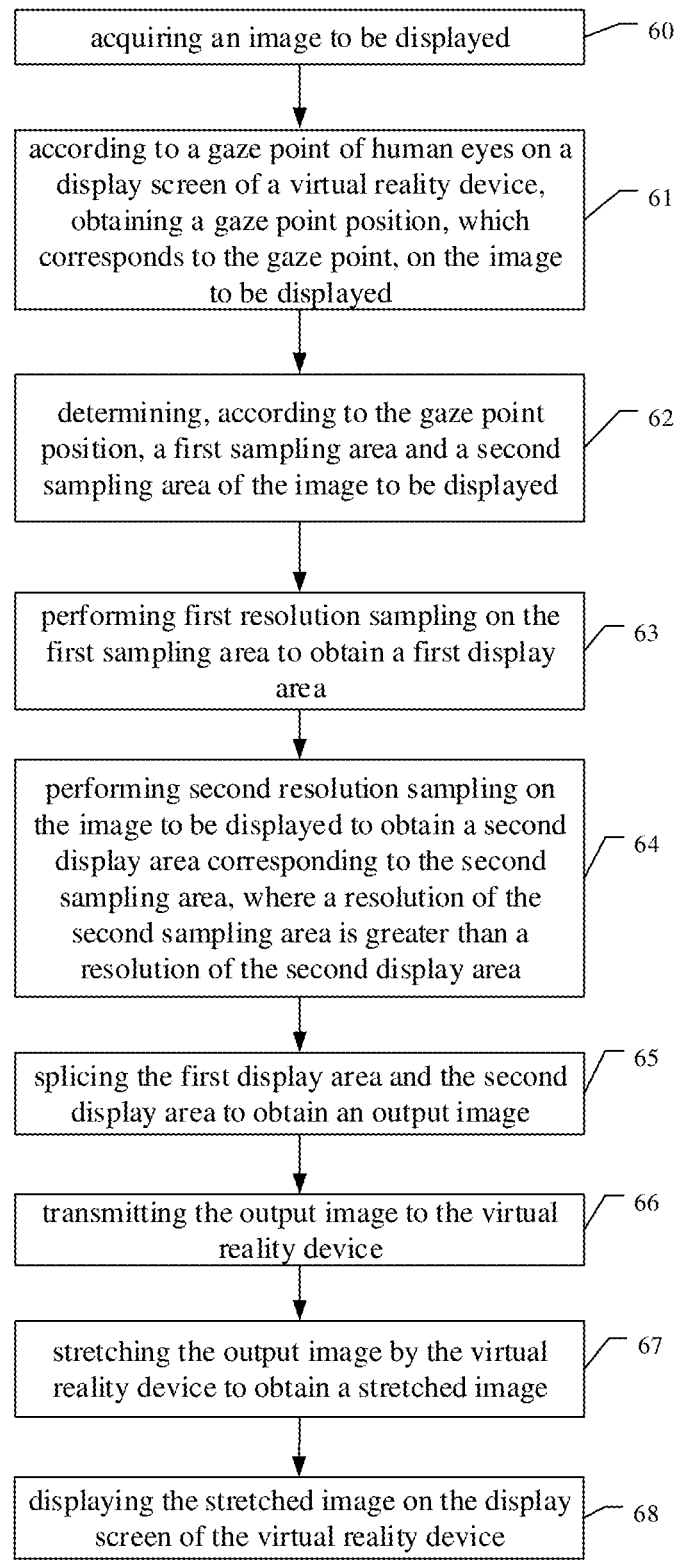
FIG. 6 is a schematic flowchart of an image display method provided by some embodiments of the present disclosure.

At least some embodiments of the present disclosure also provide an image display method. FIG. 6 is a schematic flowchart of an image display method provided by some embodiments of the present disclosure. As shown in FIG. 6, the image display method may include the following steps:

S60: acquiring an image to be displayed;

S61: according to a gaze point of human eyes on a display screen of a virtual reality device, obtaining a gaze point position, which corresponds to the gaze point, on the image to be displayed;

S62: determining, according to the gaze point position, a first sampling area and a second sampling area of the image to be displayed;

S63: performing first resolution sampling on the first sampling area to obtain a first display area;

S64: performing second resolution sampling on the image to be displayed to obtain a second display area corresponding to the second sampling area, where a resolution of the second sampling area is greater than a resolution of the second display area;

S65: splicing the first display area and the second display area to obtain an output image;

S66: transmitting the output image to the virtual reality device;

S67: stretching the output image by the virtual reality device to obtain a stretched image; and S68: displaying the stretched image on the display screen of the virtual reality device.

For example, the above steps S60 to S66 are all implemented in a rendering engine, and steps S67 to S68 are implemented in a virtual reality device. Therefore, the image display method provided by the embodiment of the present disclosure can achieve image compression rendering at the rendering engine terminal, then the output image, which is compressed, is transmitted to the virtual reality device, and then the virtual reality device displays the output image, which is compressed, thereby reducing the transmission bandwidth output by the software terminal to the display device, saving the transmission bandwidth during the image transmission process, achieving real-time sampling and transmission of images, and meeting the requirement of real-time processing of a large amount of data in the virtual reality technology.

For example, in the image display method, the detailed description of respective steps S60-S66 performed in the rendering engine may refer to the description of the image rendering method in the above embodiment. For example, the detailed description of step S60 may refer to the description of step S10, the detailed description of step S61 may refer to the description of step S11, the detailed description of step S62 may refer to the description of step S12, the detailed description of step S63 may refer to the description of step S13, the detailed description of step S64 may refer to the description of step S14, and the detailed description of steps S65 and S66 may refer to the description of step S15.

For example, the display screen may include a liquid crystal display panel or the like.

For example, the output image includes the first display area and the second display area, and step S67 includes: stretching the second display area in the output image by the virtual reality device to obtain a stretched display area; and determining the stretched image according to the first display area and the stretched display area. That is, a size of the stretched display area is larger than the size of the second display area, and the stretched image is obtained by splicing the first display area and the stretched display area, that is, the stretched image includes the stretched display area and the first display area.

For example, in some alternative implementations of this embodiment, in step S67, the received output image is stretched by an integrated circuit (IC) using the virtual reality device to obtain the stretched image, and then the stretched image is displayed on the display screen.

For example, the size of the stretched image may be identical to the size of the image to be displayed. For example, a stretching multiple of each sub-area in the second display area is identical to the compression multiple of each sub-area in the second sampling area. For example, in the example shown in FIG. 2A, for the sub-area to be displayed 1, the sub-area to be displayed 1 corresponds to the output sub-area 11 in the output image 30. In a case where the sub-area to be displayed 1 is compressed by a proportion 1/F1 in the first direction, the sub-area to be displayed 1 is compressed by a proportion 1/F2 in the second direction, that is, in the first direction, the sub-area to be displayed 1 is reduced by F1 times, and in the second direction, the sub-area to be displayed 1 is reduced by F2 times. Then in the stretching process, the output sub-area 11 needs to be stretched by a proportion F1 in the first direction, and the output sub-area 11 needs to be stretched by a proportion F2 in the second direction, that is, in the first direction, the output sub-area 11 is expanded by F1 times, and in the second direction, the output sub-area 11 is expanded by F2 times. The processing method of the remaining output sub-areas in the output image is similar to the processing method of the output sub-area 11 and will not be described in detail herein again.

For example, F1 and F2 are both greater than 1. According to actual requirements, F1 and F2 can be the same or different, and there is no restriction on F1 and F2.

A specific scene is substituted to further explain the image rendering method and the image display method for virtual reality provided by this embodiment below.

In a scene, the display screen may be a display screen of a VR (Virtual Reality)/AR (Augmented Reality) head-mounted display device, and a transmission process of the image (i.e., output image) occurs between the computer device and the VR/AR head-mounted display device.

Due to the limitation of transmission bandwidth, the computer device directly transmits 4K images to the VR/AR head-mounted display device, which puts too much pressure on hardware to complete real-time display with high resolution and high refresh rate. According to the observation definition of human eye and the implementation of human eye tracking technology, non-high-definition areas of the 4K images can be compressed to save the transmission bandwidth.

For example, as shown in FIG. 2A, for a high-resolution image to be displayed 20, the image to be displayed 20 is divided into nine sub-areas to be displayed according to the form of a nine-grid, the sub-area to be displayed 5 is the original resolution sampling area (high definition area) corresponding to the gaze point. The other eight sub-areas to be displayed are respectively processed as follows: the transverse resolutions and the longitudinal resolutions of the sub-area to be displayed 1, the sub-area to be displayed 3, the sub-area to be displayed 7, and the sub-area to be displayed 9 are simultaneously compressed by 4 times; the transverse resolutions of the sub-area to be displayed 2 and the sub-area to be displayed 8 are unchanged, and the longitudinal resolutions of the sub-area to be displayed 2 and the sub-area to be displayed 8 are compressed by 4 times. The longitudinal resolutions of the sub-area to be displayed 4 and the sub-area to be displayed 6 are unchanged, and the transverse resolution of the sub-area to be displayed 4 and the sub-area to be displayed 6 are compressed by 4 times. The resolution size of the image to be displayed 20 is 4320*4800, and the resolution size of the output image 30, which is compressed, is 2160*2400. Compared with the image to be displayed 20, the transverse resolution of the output image 30, which is compressed, is 50% of the transverse resolution of the original image to be displayed 20, and the longitudinal resolution of the output image 30, which is compressed, is 50% of the longitudinal resolution of the original image to be displayed 20, thus saving 75% of the bandwidth in the process of transmitting the output image 30. In a case where the gaze point position changes, the range and position of the original resolution sampling area (i.e. the sub-area to be displayed 5) and the ranges and sizes of the other eight sub-areas to be displayed (the size here corresponds to the resolution) are adjusted accordingly, and the correct compression output result can be completed.

As shown in FIG. 3, in the process of performing the image rendering method for virtual reality provided by the embodiment of the present disclosure: Step1 is to perform a whole sampling on the scene to obtain the original image 15, the resolution of the original image 15 is 4320*4800. Step2 is to perform inverse-distortion processing on the original image 15 obtained in Step1 to obtain an image to be displayed 20, and the resolution of the image to be displayed 20 is also 4320*4800. For example, the image to be displayed 20 includes a first sampling area and a second sampling area, and the first sampling area is an area corresponding to the gaze point position. Step3 is to perform sampling on the inverse-distortion result (i.e. the image to be displayed 20). In Step3, according to the rendering model, the original resolution (high-definition resolution) sampling is performed on the high-definition area (i.e. the first sampling area) of the image to be displayed 20 to obtain an image 25 corresponding to the first display area. The resolution of the image 25, which is sampled, is 1440*1600. In Step3, according to the rendering model, compression resolution (low resolution) sampling is performed on the entire image to be displayed 20 to obtain an intermediate image to be displayed 26, and the resolution of the intermediate image to be displayed 26, which is sampled, is 1080*1200. Then, the intermediate image to be displayed is divided according to the positional relationship between the first sampling area and the second sampling area and the proportional relationship between the first sampling area and the second sampling area to obtain a second intermediate display area corresponding to the second sampling area, and the second display area includes the second intermediate display area. It should be noted that the reason why the compression resolution (low resolution) sampling is performed on the entire image to be displayed 20 instead of on the second sampling area is convenient to implement. In fact, in some examples, only the second sampling area may be sampled. Step4 is to splice the high-definition area (i.e., the first display image) and the non-high-definition area (i.e., the second display area), to obtain the output image 30, and the resolution of the output image 30 is 2160*2400. For example, Step4 may include: determining a rendering model, which includes an original resolution sampling area and a compression resolution sampling area, according to the gaze point position; and placing the first display area at a position corresponding to the original resolution sampling area and placing the second display area at a position corresponding to the compression resolution sampling area to obtain the output image 30. Step5 is to stretch the output image 30 by the VR/AR head-mounted display device to obtain a stretched image 35, and the resolution of the stretched image 35 is 4320*4800.

For example, as shown in FIG. 4A, an original rendering model (multi-resolution) created by the modeling software is used to establish an original rendering model 200 according to a situation that the gaze point is in the center, and the original rendering model 200 includes a plurality of original sampling sub-areas; and then, a reference position of each original sampling sub-area in the original rendering model 200 is adjusted (in order to facilitate the change of the model shape). It should be noted that the reference position of each original sampling sub-area here is a point at which the position does not change during performing compression.

For example, a reference position of the original sampling sub-area 201 is a left upper corner of the original sampling sub-area 201, i.e., a point Q1. In a case where the original rendering model starts to change, only the size of the original sampling sub-area 201 is modified, and there is no need to modify the reference position of the original sampling sub-area 201. The original sampling sub-areas 203, 207 and 209 are similarly processed, that is, a reference position of the original sampling sub-area 203 is a right upper corner of the original sampling sub-area 203, namely a point Q3, a reference position of the original sampling sub-area 207 is a left lower corner of the original sampling sub-area 207, namely a point Q7, and a reference position of the original sampling sub-area 209 is a right lower corner of the original sampling sub-area 209, namely a point Q9. A reference position of the original sampling sub-area 202 is located in an upper edge of the original sampling sub-area 202, for example, a midpoint of the upper edge, i.e., a point Q2; a reference position of the original sampling sub-area 208 is located in a lower edge of the original sampling sub-area 208, e.g., a midpoint of the lower edge, i.e., a point Q8. For the original sampling sub-areas 202 and 208, in a case where the original rendering model changes, only an abscissa of the point Q2 and an abscissa of the point Q8 need to be modified while an ordinate of the point Q2 and an ordinate of the point Q8 are unchanged. A reference position of the original sampling sub-area 204 may be placed at a left edge of the original sampling sub-area 204, such as a midpoint of the left edge, i.e., a point Q4, and a reference position of the original sampling sub-area 206 may be placed at a right edge of the original sampling sub-area 206, such as the midpoint of the right edge, i.e., a point Q6. In a case where the original rendering model changes, an ordinate of the points Q4 and an ordinate of Q6 are modified, while an abscissa of the points Q4 and an abscissa of Q6 remain unchanged. A reference position of the original sampling sub-area 205 is still at a very center of the original sampling sub-area 205, i.e., a point Q5. In a case where the original rendering model changes, the original sampling sub-area 205 will not change in size, and only an abscissa and an ordinate of the point Q5 are modified.

For example, the original rendering model is located in a Cartesian coordinate system x-o-y, and a coordinate origin o of the Cartesian coordinate system x-o-y coincides with the point Q5.

For example, in the Cartesian coordinate system x-o-y, the abscissas of points Q1, Q4, and Q7 are the same, the abscissas of points Q2, Q5, and Q8 are the same, and the abscissas of points Q3, Q6, and Q9 are the same. The ordinates of points Q1, Q2, and Q3 are the same, the ordinates of points Q4, Q5, and Q6 are the same, and the ordinates of points Q7, Q8, and Q9 are the same.

For example, as shown in FIG. 4B, in some examples, the rendering model 100 is obtained after adjusting the original rendering model 200. The rendering model 100 includes a plurality of sampling sub-areas, and the plurality of sampling sub-areas are in one-to-one correspondence to the plurality of original sampling sub-areas shown in FIG. 4A.

For example, a reference position of the sampling sub-area 101 is a left upper corner of the sampling sub-area 101, that is, a point P1. In the Cartesian coordinate system x-o-y, a coordinate of the point P1 is the same as a coordinate of the reference position Q1 of the original sampling sub-area 201, while the size of the sampling sub-area 101 is different from the size of the original sampling sub-area 201. Sampling sub-areas 103, 107, and 109 are also similar to the sampling sub-area 101, that is, a reference position of the sampling sub-area 103 is a right upper corner of the sampling sub-area 103, i.e., a point P3, a reference position of the sampling sub-area 107 is a left lower corner of the sampling sub-area 107, i.e., a point P7, and a reference position of the sampling sub-area 109 is a right lower corner of the sampling sub-area 109, i.e., a point P9.

For example, a reference position of the sampling sub-area 102 is located in an upper edge of the sampling sub-area 102, such as a midpoint of the upper edge, i.e., a point P2, and a reference position of the sampling sub-area 108 is located in a lower edge of the sampling sub-area 108, such as a midpoint of the lower edge, i.e., a point P8. In the Cartesian coordinate system x-o-y, an ordinate of the point P2 is the same as the ordinate of the reference position Q2 of the original sampling sub-area 202, while an abscissa of the point P2 is different from the abscissa of the reference position Q2 of the original sampling sub-area 202; and similarly, an ordinate of the point P8 is the same as the ordinate of the reference position Q8 of the original sampling sub-area 208, while an abscissa of the point P8 is different from the abscissa of the reference position Q8 of the original sampling sub-area 208.

For example, a reference position of the sampling sub-area 104 may be located in a left edge of the sampling sub-area 104, such as a midpoint of the left edge, i.e., a point P4, and a reference position of the sampling sub-area 106 may be located in a right edge of the sampling sub-area 106, such as a midpoint of the right edge, i.e., a point P6. In the Cartesian coordinate system x-o-y, an abscissa of the point P4 is the same as the abscissa of the reference position Q4 of the original sampling sub-area 204, while an ordinate of the point P4 is different from the ordinate of the reference position Q4 of the original sampling sub-area 204; and similarly, an abscissa of the point P6 is the same as the abscissa of the reference position Q6 of the original sampling sub-area 206, while an ordinate of the point P6 is different from the ordinate of the reference position Q6 of the original sampling sub-area 206.

For example, a reference position of the sampling sub-area 105 is located in a center of the sampling sub-area 105, that is, a point P5. In the Cartesian coordinate system x-o-y, an abscissa of the point P5 is different from the abscissa of the reference position Q5 of the original sampling sub-area 205, and an ordinate of the point P5 is also different from the ordinate of the reference position Q5 of the original sampling sub-area 205. The sampling sub-area 105 has the same size as the original sampling sub-area 205. As shown in FIG. 4B, the reference position P5 of the sampling sub-area 105 does not coincide with the coordinate origin o of the Cartesian coordinate system x-o-y.

For example, in the Cartesian coordinate system x-o-y, the abscissas of points P1, P4, and P7 are the same, the abscissas of points P2, P5, and P8 are the same, and the abscissas of points P3, P6, and P9 are the same. The ordinates of points P1, P2, and P3 are the same, the ordinates of points P4, P5, and P6 are the same, and the ordinates of points P7, P8, and P9 are the same.

Figure 7:
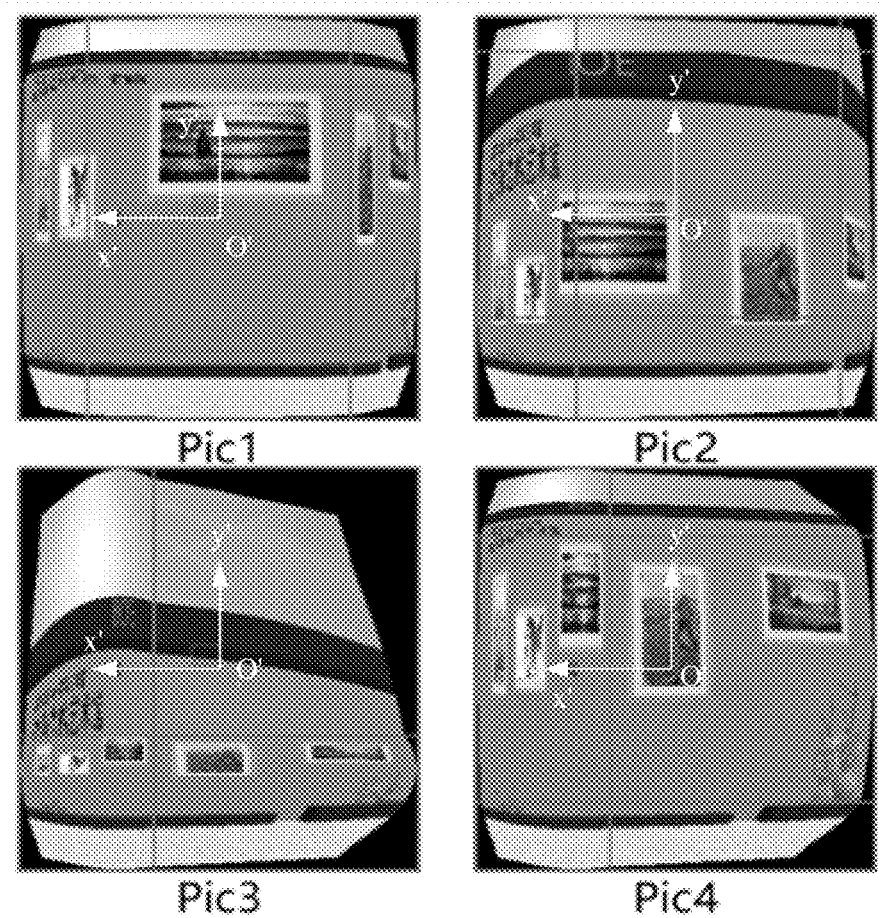
FIG. 7 is a schematic diagram of rendering models and output images corresponding to different gaze point positions provided by some embodiments of the present disclosure.

FIG. 7 is a schematic diagram of rendering models and output images corresponding to different gaze point positions provided by some embodiments of the present disclosure.

For example, as shown in FIG. 7, the position, where the gaze point can fall, is projected into a two-dimensional coordinate systems x'-o'-y' which is from (−1, −1) to (1,1). For example, an area bounded by a center point of the sub-area to be displayed 1, a center point of the sub-area to be displayed 3, a center point of the sub-area to be displayed 7, and a center point of the sub-area to be displayed 9 in the image to be displayed 20 as shown in FIG. 2A is the position where the gaze point can fall. In the two-dimensional coordinate system x'-o'-y', a coordinate of the center point of the sub-area to be displayed 1 is (−1,1), a coordinate of the center point of the sub-area to be displayed 2 is (0,1), a coordinate of the center point of the sub-area to be displayed 3 is (1,1), a coordinate of the center point of the sub-area to be displayed 4 is (−1,0), a coordinate of the center point of the sub-area to be displayed 5 is (0,0), and a coordinate of the center point of the sub-area to be displayed 6 is (1,0), a coordinate of the center point of the sub-area to be displayed 7 is (−1, −1), a coordinate of the center point of the sub-area to be displayed 8 is (0, −1), and a coordinate of the center point of the sub-area to be displayed 9 is (1, −1).

For example, gaze point positions corresponding to four cases (i.e., Pic1, Pic2, Pic3, and Pic4) as shown in FIG. 7 are (0, 0), (0.5, 0.5), (1, 1) (areas of the sampling sub-areas 101, 102, 103, 106, 109 are 0), (1, 0) (areas of the sampling sub-areas 103, 106, 109 are 0) in the two-dimensional coordinate system x'-o'-y', respectively. In a case where the gaze point position changes, area sizes and corresponding ranges of the original sampling sub-areas 201, 203, 207, 209 are modified according to the gaze point position, while reference positions of the original sampling sub-areas 201, 203, 207, 209 do not need to be modified; the abscissas of the reference positions, the area sizes in the longitudinal direction, and the corresponding ranges of the original sampling sub-areas 202, 208 are modified according to the gaze point position; and the ordinates of the reference positions, the area sizes in the transverse direction, and the corresponding ranges of the original sampling sub-areas 204, 206 are modified according to the gaze point position. The abscissa and ordinate of the reference position of the original sampling area 205 are modified according to the gaze point position, and meanwhile, the position of the virtual camera is adjusted, thereby obtaining an inverse-distortion image of the high definition area.

For example, the sampling sub-area 101 is obtained by adjusting the original sampling sub-area 201, and the calculation result of the sampling sub-area 101 is as follows.

Assume that the coordinate of the gaze point position in the two-dimensional coordinate system x'-o'-y' is (x,y)(x∈[−1,1], y∈[−1,1]).

Then the size of the sampling sub-area 101 is: localScale=(x+1, 1−y). For example, in some examples, in a case where the original sampling sub-area 201 and the sampling sub-area 101 are rectangles, and a first edge of the original sampling sub-area 201 is T1, a second edge of the original sampling sub-area 201 is T2, and the first edge and the second edge are two adjacent edges of the original sampling sub-area 201, the first edge represents an edge in the first direction and the second edge represents an edge in the second direction. The sampling sub-area 101 includes a third edge and a fourth edge, the third edge of the sampling sub-area 101 corresponds to the first edge of the original sampling sub-area 201, and the fourth edge of the sampling sub-area 101 corresponds to the second edge of the original sampling sub-area 201, then the third edge is represented as T1\*(1−y), and the fourth edge is represented as T2\*(x+1).

For example, a pasting image area corresponding to the sampling sub-area 101 is:

mainTextureScale=((x+1)/3,(1−y)/3)

mainTextureOffset=(0,(y+2)/3).

For example, in some examples, the shape of the rendering model may be a rectangle, the rendering model can be located in a two-dimensional coordinate system x"-o"-y", a left lower corner of the rendering model is located at a coordinate origin of the two-dimensional coordinate system x"-o"-y", and the rendering model is projected to an area from (−1, −1) to (1, 1). A length of the rendering model is R1 in an x" axis direction, and a length of the rendering model is R2 in a y" axis direction. In the x" axis direction, a length of the sampling sub-area 101 is R1\*(x+1)/3, and in the y" axis direction, a length of the sampling sub-area 101 is R2\*(1−y)/3. A coordinate of the left lower corner of the sampling sub-area 101 in the two-dimensional coordinate system x"-o"-y" is (0, (y+2)/3).

The area sizes, reference positions and ranges of the other sampling sub-areas are also calculated by a similar method. For example, the size of the sampling sub-area 102 is: localScale=(1, 1−y), and a pasting image area corresponding to the sampling sub-area 102 is:

mainTextureScale=(1/3,(1−y)/3)

mainTextureOffset=(1/3,(y+2)/3).

In a case where the gaze point position changes, the value of x and the value of y are changed, and the corresponding rendering model changes, thus generating an output image matching the current gaze point position.

Figure 8:
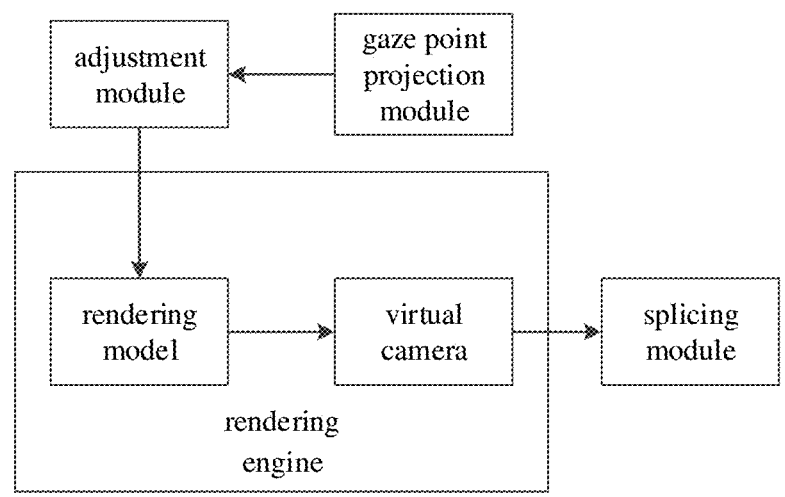
FIG. 8 shows a structural schematic diagram of an image rendering device for virtual reality provided by at least some embodiments of the present disclosure.

FIG. 8 shows a structural schematic diagram of an image rendering device for virtual reality provided by at least some embodiments of the present disclosure. As shown in FIG. 8, other embodiments of the present disclosure provide an image rendering device for virtual reality, and the image rendering device includes a gaze point projection module, an adjustment module, a rendering engine, and a splicing module.

For example, the gaze point projection module is configure to obtain, according to a gaze point of human eyes on a display screen of a virtual reality device, a gaze point position, which corresponds to the gaze point, on the image to be displayed.

For example, the rendering engine is configure to: determine, according to the gaze point position, a first sampling area and a second sampling area of the image to be displayed; perform first resolution sampling on the first sampling area to obtain a first display area; perform second resolution sampling on the image to be displayed to obtain a second display area corresponding to the second sampling area. For example, a resolution of the second sampling area is greater than a resolution of the second display area.

For example, as shown in FIG. 8, the rendering engine includes a virtual camera and a rendering model, and the virtual camera is configured to perform first resolution sampling on the first sampling area and perform second resolution sampling on the image to be displayed according to the rendering model.

For example, in some examples, the rendering engine may be further configured to load the rendering model, i.e., determine the rendering model, according to the gaze point position, the rendering model includes an original resolution sampling area, a compression resolution sampling area, and a resolution compression multiple of the compression resolution sampling area; the original resolution sampling area corresponds to the first sampling area, and the compression resolution sampling area corresponds to the second sampling area.

For example, the rendering engine is further configured to acquire an original rendering model, and the original rendering model includes an original original-resolution sampling area and an original compression resolution sampling area.

For example, the adjustment module is configured to, according to the gaze point position, adjust a center point position of the original original-resolution sampling area and a resolution compression multiple of the original compression resolution sampling area to determine the rendering model.

For example, the splicing module is configured to splice the first display area and the second display area to obtain an output image to be transmitted to the virtual reality device.

It should be noted that the components of the image rendering device as shown in FIG. 8 are only exemplary and not limiting, and the image rendering device may also have other components according to actual application needs.

It should be noted that the principle and the working process of the image rendering device for virtual reality provided in this embodiment are similar to the above-mentioned image rendering method for virtual reality, for the relevant points, reference may be made to the above description, and details are not repeated herein again.

Figure 9:
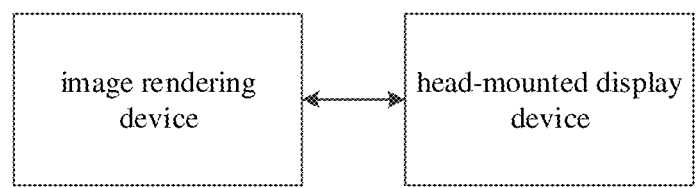
FIG. 9 shows a schematic diagram of an image rendering system for virtual reality provided by at least some embodiments of the present disclosure.

FIG. 9 shows a schematic diagram of an image rendering system for virtual reality provided by at least some embodiments of the present disclosure.

For example, other embodiments of the present disclosure provide an image rendering system for virtual reality, and the image rendering system includes a virtual reality device and an image rendering device. The image rendering device include a gaze point projection module, an adjustment module, a rendering engine, and a splicing module.

The gaze point projection module is configure to obtain, according to a gaze point position of human eyes on a display screen of a virtual reality device, a position, which corresponds to the gaze point, on the image to be displayed on the display screen.

The rendering engine is configure to load a rendering model, and the rendering model is preset with an original resolution sampling area, a compression resolution sampling area and a transverse resolution compression multiple and/or a longitudinal resolution compression multiple of the compression resolution sampling area.

The adjustment module is configured to adjust a center point position of the original resolution sampling area and the transverse resolution compression multiple and/or the longitudinal resolution compression multiple of the compression resolution sampling area according to the position, which corresponds to the gaze point, on the image to be displayed on the display screen.

The rendering engine is configured to perform original resolution sampling on the original resolution sampling area of the image and perform compression resolution sampling on the compression resolution sampling area according to the rendering model which is adjusted.

The splicing module is configured to splice the original resolution sampling area, which is sampled, and the compression resolution sampling area, which is sampled, to obtain the image to be transmitted to the virtual reality device.

For example, as shown in FIG. 9, other embodiments of the present disclosure also provide an image rendering system for virtual reality, and the image rendering system includes a virtual reality device and an image rendering device. The image rendering device is the image rendering device according to any one of the above embodiments of the present disclosure.

For example, the virtual reality device may be a head-mounted display device or the like. The head-mounted display device is used for acquiring the gaze point of human eyes on the display screen of the virtual reality device and receiving the output image transmitted by the image rendering device.

For example, the virtual reality device is also configured to acquire an original image of a scene. The virtual reality device or the image rendering device can perform inverse-distortion processing on the original image to obtain an image to be displayed.

It should be noted that the principle and the working process of the image rendering system for virtual reality provided in this embodiment are similar to the above-mentioned image rendering method for virtual reality, for the relevant points, reference can be made to the above description, and details will not be repeated herein again.

Figure 10:
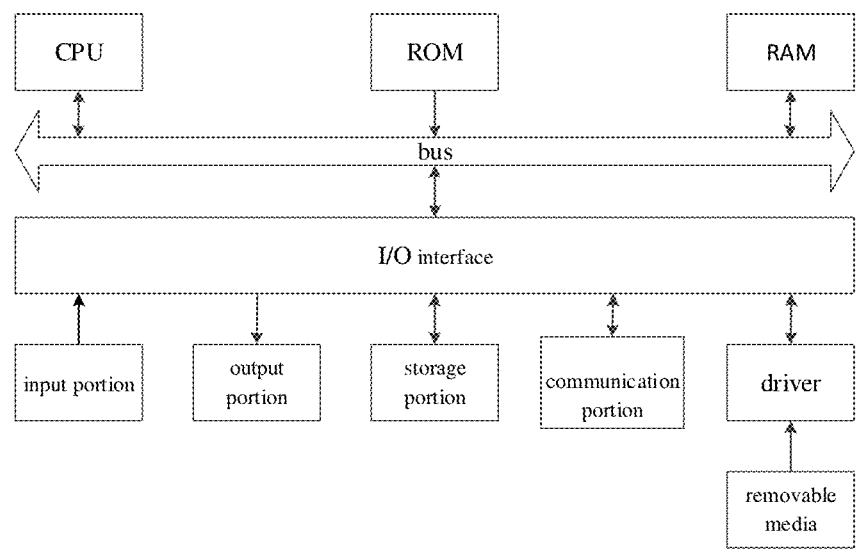
FIG. 10 shows a structural schematic diagram of a computer device provided by at least some embodiments of the present disclosure.

FIG. 10 shows a structural schematic diagram of a computer device provided by at least some embodiments of the present disclosure. Another embodiment of the present disclosure provides a computer device.

For example, a computer device includes a memory and a processor. For example, the memory is configured to store a computer program. The processor is configured to execute the computer program. In a case where the computer program is executed by the processor, one or more steps in the image rendering method described in any one of the above embodiments are implemented.

For example, the processor may be a central processing unit (CPU) or other form of processing unit having data processing capability and/or program execution capability, such as a field programmable gate array (FPGA) or tensor processing unit (TPU), etc.

For example, the memory may include any combination of one or more computer program products, which may include various forms of computer readable storage media, such as volatile memory and/or non-volatile memory. The volatile memory may include, for example, random access memory (RAM) and/or cache, etc. The non-volatile memory may include, for example, read only memory (ROM), hard disk, erasable programmable read only memory (EPROM), portable compact disk read only memory (CD-ROM), USB memory, flash memory, and the like. One or more computer instructions may be stored on the memory, and the processor may execute the computer instructions to implement various functions. Various application programs and various data as well as various data used and/or generated by the application programs may also be stored in the computer readable storage medium.

For example, as shown in FIG. 10, in some examples, the computer device includes a central processing unit (CPU) that can perform various appropriate actions and processes according to a program stored in a read-only memory (ROM) or a program loaded from a storage portion into a random access memory (RAM). In the RAM, various programs and data required for the operation of the computer system are also stored. CPU, ROM, and RAM are connected with each other by bus. An input/output (I/O) interface is also connected to the bus.

The following components are connected to the I/O interface: an input portion including a keyboard, a mouse, etc.; an output portion including such as a liquid crystal display (LCD) or the like and a speaker or the like; a storage portion including a hard disk or the like; and a communication portion including a network interface card such as a LAN card, a modem, etc. The communication portion performs communication processing via a network such as the Internet. A driver is also connected to I/O interfaces as needed. Removable media, such as magnetic disks, optical disks, magneto-optical disks, semiconductor memories, etc., are installed on the driver as needed so that computer programs read from the driver can be installed into the storage portion as needed.

For example, according to the present embodiment, the process described in the flowchart above may be implemented as a computer software program. For example, the embodiment includes a computer program product including a computer program tangibly embodied on a computer readable medium, the above computer program includes program code for performing the method as shown in the flowchart. In such embodiments, the computer program may be downloaded and installed from the network through the communication portion and/or be installed from the removable medium.

The flowcharts and schematic diagrams in the drawings illustrate the architecture, functions, and operations of possible implementations of the system, method and computer program product of this embodiment. In this regard, each block in the flowchart or schematic diagram may represent a module, program segment, or a part of code, the above module, program segment, or a part of code contain one or more executable instructions for implementing specified logical functions. It should also be noted that in some alternative implementations, the functions noted in the blocks may also occur in an order different than that noted in the figures. For example, two blocks shown in a succession may actually be performed substantially in parallel, and the two blocks may sometimes be performed in the reverse order, which is depends on the functions involved. It should also be noted that each block in the schematic diagrams and/or flowchart, and combinations of blocks in the schematic diagrams and/or flowchart, can be implemented by dedicated hardware-based systems that perform specified functions or operations, or can be implemented by combinations of dedicated hardware and computer instructions.

The units described in this embodiment may be implemented by software or hardware. The described unit can also be placed in the processor, for example, it can be described as a processor including a gaze point projection module, an adjustment module, a rendering engine, and a splicing module. The names of these units do not constitute a limitation on the unit itself under certain circumstances. For example, the gaze point projection module can also be described as "an image gaze point acquisition module".

Some embodiments of the present disclosure also provide a non-volatile computer storage medium, the non-volatile computer storage medium may be the non-volatile computer storage medium included in the above-mentioned computer devices in the above-mentioned embodiments, or may be a non-volatile computer storage medium that exists separately and not assembled in the terminal. The non-volatile computer storage medium stores one or more programs, and in a case where the one or more programs are executed by a device, the image rendering method described in any one of the above embodiments can be implemented.

In the description of the present disclosure, it should be noted that the orientation or positional relationship indicated by the terms "up", "down", and the like is based on the orientation or positional relationship shown in the drawings, and is only for convenience of describing the present disclosure and simplifying the description, and does not indicate or imply that the indicated device or element must have a specific orientation, be constructed and operated in a specific orientation, and therefore cannot be understood as limiting the present disclosure. Unless otherwise expressly specified and defined, the terms "installed", "connect", and "connected" shall be broadly understood, for example, it may be fixed connection, removable connection, or integral connection; and it can be mechanical connection or electrical connection, and it can be direct connection, can also be indirect connection through an intermediate medium, can be the internal communication between two components. For those of ordinary skill in the art, the specific meanings of the above terms in this disclosure can be understood according to specific situations.

It should also be noted that in the description of the present disclosure, relational terms such as first and second, etc. are only used to distinguish one entity or operation from another entity or operation, and do not necessarily require or imply any such actual relationship or order between these entities or operations. Moreover, the terms "include", "comprising" or any other variation thereof are intended to cover a non-exclusive inclusion, such that a process, method, article, or device, that comprises a series of elements, does not include only those elements but also other elements not expressly listed or elements that are inherent to such process, method, article, or device. Without further limitation, an element defined by the statement "includes a . . . " does not exclude the presence of another identical element in a process, method, article or device that includes the element.

Obviously, the above-mentioned embodiments of the present disclosure are merely examples for clearly explaining the present disclosure, and are not intended to limit the embodiments of the present disclosure. For those of ordinary skill in the art, other variations or modifications of different forms can be made on the basis of the above description. It is not possible to exhaustively list all the embodiments here, and any obvious changes or variations that belong to the technical scheme of the present disclosure are still within the protection scope of the present disclosure.

What is claimed is:

1. An image rendering method for virtual reality, the method comprising:
    acquiring an image to be displayed;
    according to a gaze point of human eyes on a display screen of a virtual reality device, obtaining a gaze point position, which corresponds to the gaze point, on the image to be displayed;
    determining, according to the gaze point position, a first sampling area and a second sampling area of the image to be displayed;
    performing first resolution sampling on the first sampling area to obtain a first display area;
    performing second resolution sampling on the image to be displayed to obtain a second display area corresponding to the second sampling area, wherein a resolution of the second sampling area is greater than a resolution of the second display area; and
    splicing the first display area and the second display area to obtain an output image to be transmitted to the virtual reality device;
    wherein performing the first resolution sampling on the first sampling area and performing the second resolution sampling on the image to be displayed comprises:
    determining a rendering model according to the gaze point position, wherein the rendering model comprises an original resolution sampling area, a compression resolution sampling area, and a resolution compression multiple of the compression resolution sampling area, the original resolution sampling area corresponds to the first sampling area, and the compression resolution sampling area corresponds to the second sampling area; and
    according to the rendering model, performing the first resolution sampling on the first sampling area and performing the second resolution sampling on the image to be displayed,
    wherein determining the rendering model according to the gaze point position comprises:
    acquiring an original rendering model, wherein the original rendering model comprises an original original-resolution sampling area and an original compression resolution sampling area; and
    according to the gaze point position, adjusting a center point position of the original original-resolution sampling area and a resolution compression multiple of the original compression resolution sampling area to obtain the rendering model.

2. The image rendering method according to claim 1, wherein the resolution compression multiple of the original compression resolution sampling area is preset and adjusted according to a positional relationship between the original compression resolution sampling area and the original original-resolution sampling area.

3. The image rendering method according to claim 1, wherein the resolution compression multiple of the compression resolution sampling area comprises a transverse resolution compression multiple and/or a longitudinal resolution compression multiple.

4. The image rendering method according to claim 1, wherein the original resolution sampling area and the compression resolution sampling area form a nine-grid structure, the nine-grid structure comprises a plurality of areas arranged in three rows and three columns, and the original resolution sampling area is located in a second row and a second column of the nine-grid structure.

5. The image rendering method according to claim 1, wherein a size of the first sampling area, a size of the original original-resolution sampling area, and a size of the original resolution sampling area are identical.

6. The image rendering method according to claim 1, wherein adjusting the center point position of the original original-resolution sampling area comprises:
    in a case where a center point of the original original-resolution sampling area is the gaze point position, judging whether the original original-resolution sampling area exceeds a boundary of the image to be displayed:
    if not, adjusting the center point of the original original-resolution sampling area to be the gaze point position; and
    if yes, adjusting the center point of the original original-resolution sampling area to be a position closest to the gaze point position in a case where the original original-resolution sampling area does not exceed the boundary of the image to be displayed.

7. The image rendering method according to claim 6, wherein according to the rendering model, performing the second resolution sampling on the image to be displayed, comprises:
according to the rendering model, performing the second resolution sampling on the image to be displayed to obtain an intermediate image to be displayed; and
according to a positional relationship between the first sampling area and the second sampling area and a proportional relationship between the first sampling area and the second sampling area, dividing the intermediate image to be displayed to obtain a first intermediate display area corresponding to the first sampling area and a second intermediate display area corresponding to the second sampling area,
wherein the second display area comprises the second intermediate display area.

8. The image rendering method according to claim 1, wherein according to the rendering model, performing the second resolution sampling on the image to be displayed, comprises:
according to the rendering model, performing the second resolution sampling on the image to be displayed to obtain an intermediate image to be displayed; and
according to a positional relationship between the first sampling area and the second sampling area and a proportional relationship between the first sampling area and the second sampling area, dividing the intermediate image to be displayed to obtain a first intermediate display area corresponding to the first sampling area and a second intermediate display area corresponding to the second sampling area,
wherein the second display area comprises the second intermediate display area.

9. The image rendering method according to claim 1, wherein acquiring the image to be displayed comprises:
acquiring an original image; and
performing an inverse-distortion processing on the original image to obtain the image to be displayed.

10. The image rendering method according to claim 1, wherein a resolution of the first sampling area is equal to a resolution of the first display area.

11. An image display method, comprising:
in a rendering engine:
acquiring an image to be displayed;
according to a gaze point of human eyes on a display screen of a virtual reality device, obtaining a gaze point position, which corresponds to the gaze point, on the image to be displayed;
determining, according to the gaze point position, a first sampling area and a second sampling area of the image to be displayed;
performing first resolution sampling on the first sampling area to obtain a first display area;
performing second resolution sampling on the image to be displayed to obtain a second display area corresponding to the second sampling area, wherein a resolution of the second sampling area is greater than a resolution of the second display area;
splicing the first display area and the second display area to obtain an output image; and
transmitting the output image to the virtual reality device; and in the virtual reality device, stretching the output image by the virtual reality device to obtain a stretched image; and
displaying the stretched image on the display screen of the virtual reality device;
wherein in the rendering engine:
performing the first resolution sampling on the first sampling area and performing the second resolution sampling on the image to be displayed comprises:
determining a rendering model according to the gaze point position, wherein the rendering model comprises an original resolution sampling area, a compression resolution sampling area, and a resolution compression multiple of the compression resolution sampling area, the original resolution sampling area corresponds to the first sampling area, and the compression resolution sampling area corresponds to the second sampling area; and
according to the rendering model, performing the first resolution sampling on the first sampling area and performing the second resolution sampling on the image to be displayed;
wherein in the rendering engine:
determining the rendering model according to the gaze point position comprises:
acquiring an original rendering model, wherein the original rendering model comprises an original original-resolution sampling area and an original compression resolution sampling area; and
according to the gaze point position, adjusting a center point position of the original original-resolution sampling area and a resolution compression multiple of the original compression resolution sampling area to obtain the rendering model.

12. The image display method according to claim 11, wherein the output image comprises the first display area and the second display area,
stretching the output image by the virtual reality device to obtain the stretched image comprises:
stretching the second display area in the output image by the virtual reality device to obtain a stretched display area; and
determining the stretched image according to the first display area and the stretched display area.

13. An image rendering device for virtual reality, comprising a gaze point projection module, a rendering engine, and a splicing module;
wherein the gaze point projection module is configure to obtain, according to a gaze point of human eyes on a display screen of a virtual reality device, a gaze point position, which corresponds to the gaze point, on the image to be displayed;
the rendering engine is configure to:
determine a first sampling area and a second sampling area of the image to be displayed;
perform first resolution sampling on the first sampling area to obtain a first display area; and
perform second resolution sampling on the image to be displayed to obtain a second display area corresponding to the second sampling area, wherein a resolution of the second sampling area is greater than a resolution of the second display area; and
the splicing module is configured to splice the first display area and the second display area to obtain an output image to be transmitted to the virtual reality device;
wherein the rendering engine is further configured to:
determine a rendering model according to the gaze point position, wherein the rendering model comprises an original resolution sampling area, a compression resolution sampling area, and a resolution compression multiple of the compression resolution sampling area, the original resolution sampling area corresponds to the first sampling area, and the compression resolution sampling area corresponds to the second sampling area; and according to the rendering model, perform the first resolution sampling on the first sampling area and perform the second resolution sampling on the image to be displayed, the image rendering device further comprises an adjustment module, wherein the rendering engine is further configured to acquire an original rendering model, the original rendering model comprises an original original-resolution sampling area and an original compression resolution sampling area; and the adjustment module is configured to, according to the gaze point position, adjust a center point position of the original original-resolution sampling area and a resolution compression multiple of the original compression resolution sampling area to determine the rendering model.

14. An image rendering system for virtual reality, comprising:

a virtual reality device, and an image rendering device according to claim 13, wherein the virtual reality device is configured to acquire the gaze point of the human eyes on the display screen of the virtual reality device and receive the output image transmitted by the image rendering device.

15. A non-transitory computer readable storage medium, which stores a computer program, wherein in a case where the computer program is executed by a processor, the image rendering method according to claim 1 is implemented.

16. A computer device, comprising:

a memory configured to store a computer program; and a processor configured to execute the computer program, wherein in a case where the computer program is executed by the processor, the image rendering method according to claim 1 is implemented.

\* \* \* \* \*